(12) United States Patent
Imai

(10) Patent No.: US 7,751,107 B2
(45) Date of Patent: Jul. 6, 2010

(54) LIGHT SCANNING DEVICE AND IMAGE FORMING APPARATUS

(75) Inventor: Shigeaki Imai, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 249 days.

(21) Appl. No.: 12/106,826

(22) Filed: Apr. 21, 2008

(65) Prior Publication Data

US 2008/0259426 A1  Oct. 23, 2008

(30) Foreign Application Priority Data

Apr. 20, 2007  (JP) .............................. 2007-111945

(51) Int. Cl.
*G02B 26/08* (2006.01)
(52) U.S. Cl. ................. 359/205.1; 359/196.1; 347/239; 347/255
(58) Field of Classification Search ................. None
See application file for complete search history.

(56) References Cited

U.S. PATENT DOCUMENTS

| 6,813,051 | B2 | 11/2004 | Suzuki et al. |
| 7,277,212 | B2 | 10/2007 | Miyatake et al. |
| 2004/0240000 | A1 | 12/2004 | Miyatake et al. |
| 2005/0190420 | A1 | 9/2005 | Imai et al. |
| 2006/0158711 | A1 | 7/2006 | Imai et al. |
| 2006/0171009 | A1 * | 8/2006 | Hendriks et al. ............ 359/198 |
| 2007/0058255 | A1 | 3/2007 | Imai et al. |
| 2007/0146849 | A1 | 6/2007 | Miyatake et al. |
| 2007/0236557 | A1 | 10/2007 | Imai et al. |
| 2008/0019255 | A1 | 1/2008 | Imai et al. |
| 2008/0068678 | A1 | 3/2008 | Suzuki et al. |

FOREIGN PATENT DOCUMENTS

| JP | 4-171415 | 6/1992 |
| JP | 9-64444 | 3/1997 |
| JP | 10-227992 | 8/1998 |
| JP | 3507244 | 12/2003 |
| JP | 3920487 | 2/2007 |

* cited by examiner

*Primary Examiner*—James Phan
(74) *Attorney, Agent, or Firm*—Oblon, Spivak, McClelland, Maier & Neustadt, L.L.P.

(57) ABSTRACT

A light scanning device includes: a light source; an aperture stop regulating a width of a light beam emitted from the light source; a deflector deflecting and scanning the light beam emitted from the light source; at least one scanning lens forming an image on a scanned surface with the light beam deflected and scanned; and a phase-type optical element. In the light scanning device, a phase modulation portion is provided to at least a portion of the phase-type optical element, and a phase difference between the phase modulation portion and a region other than the phase modulation portion is not π [radian]. Thus, asymmetry in a curve representing the relationship between a beam spot diameter and defocus can be corrected to reduce variation of the beam spot diameter with respect to the defocus. Consequently, highly-accurate light scanning can be performed.

12 Claims, 31 Drawing Sheets

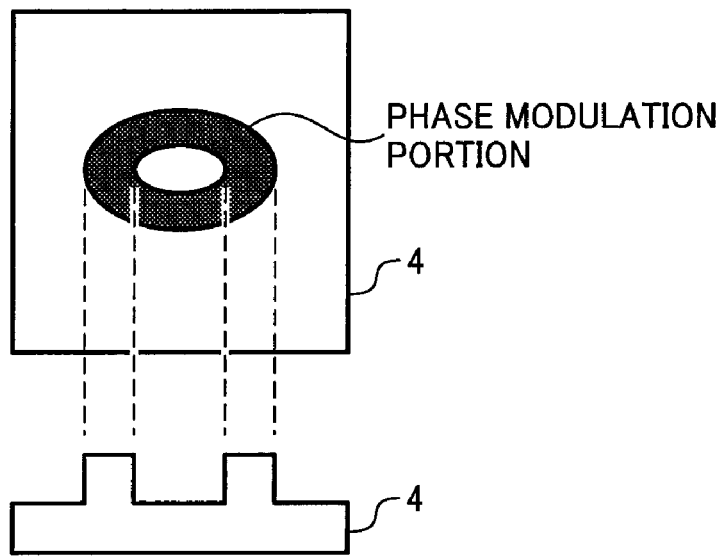

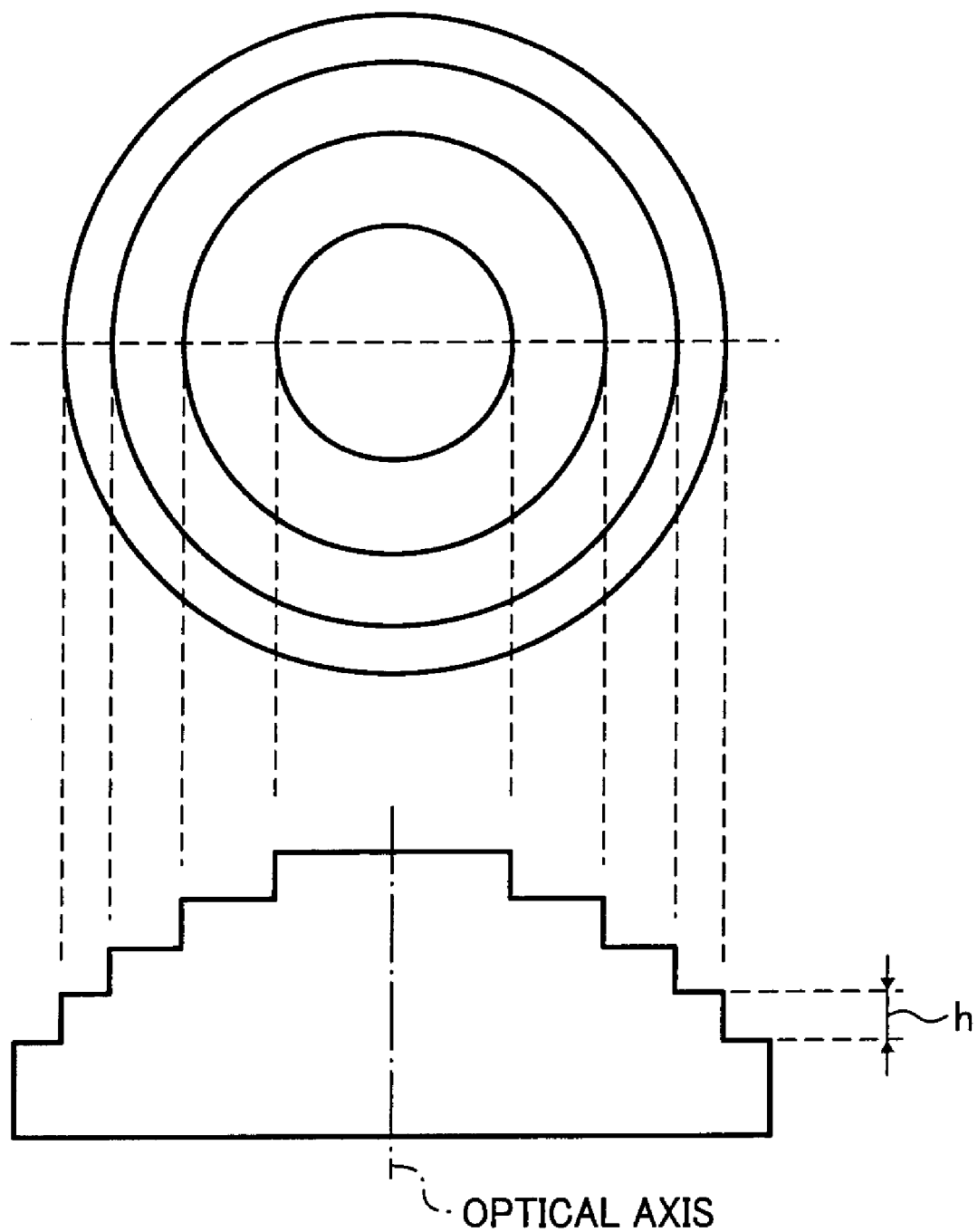

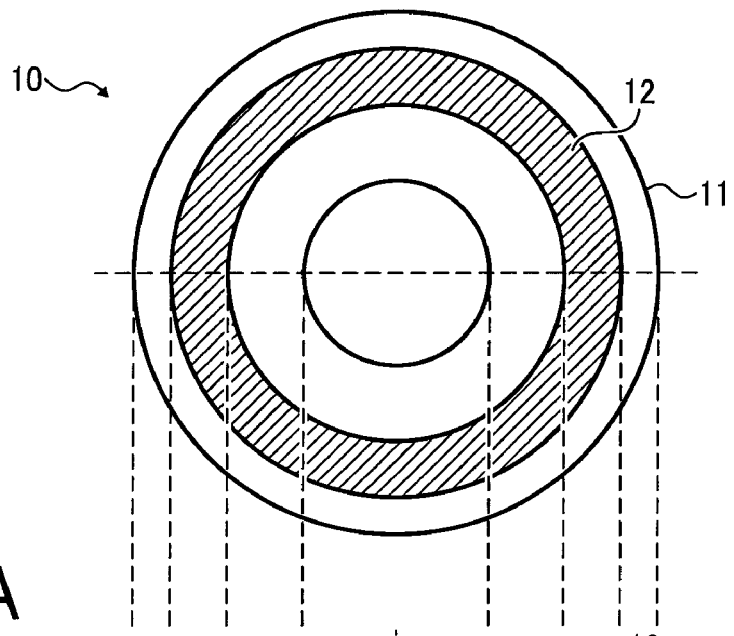
FIG. 13A
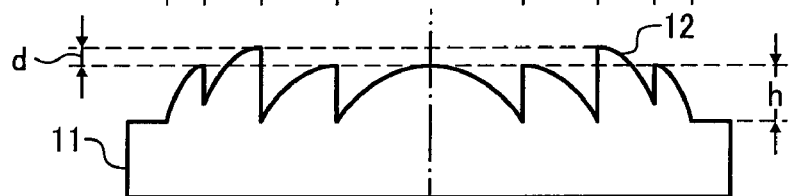
FIG. 13B
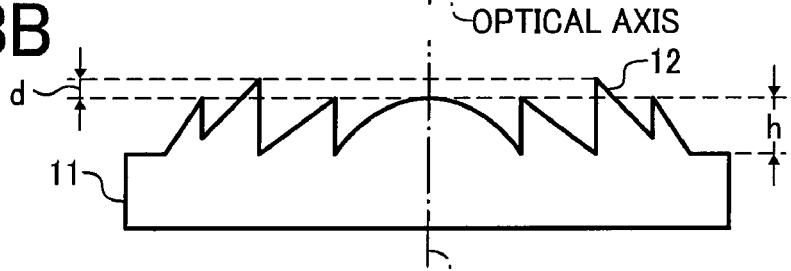
FIG. 13C
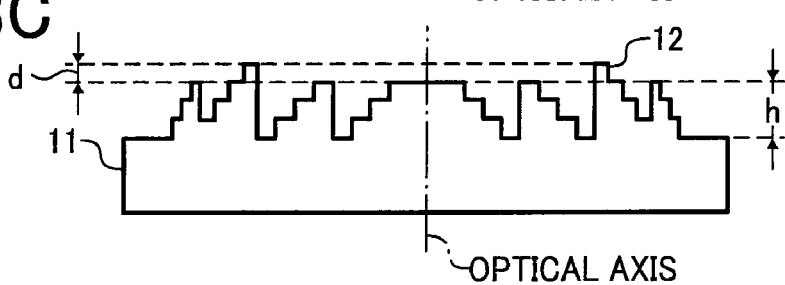

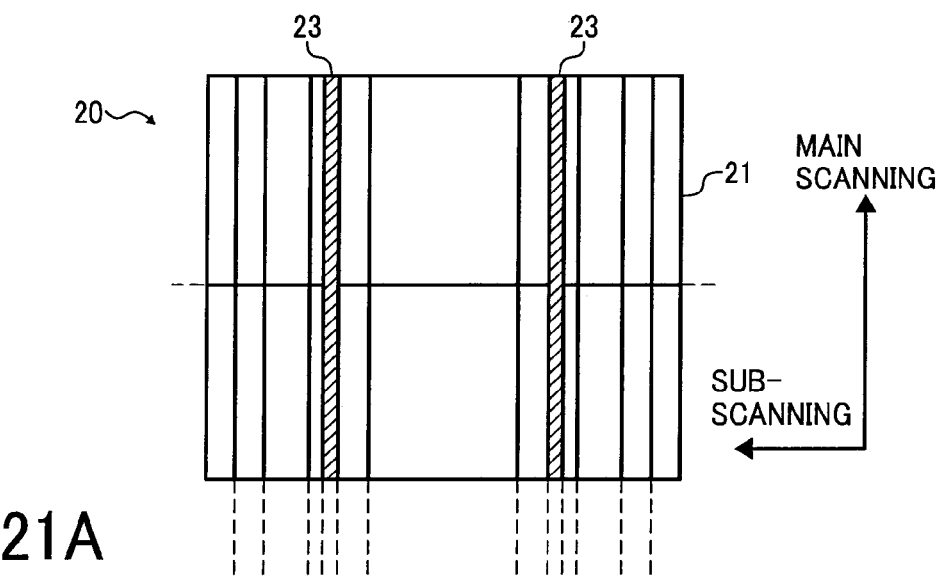
FIG. 21A
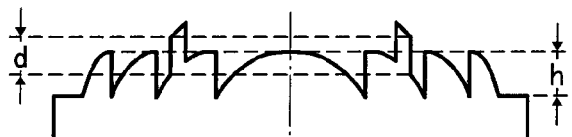
FIG. 21B
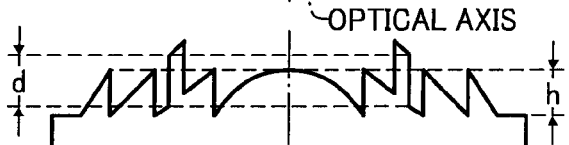
FIG. 21C
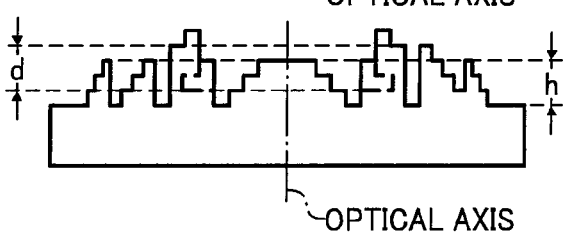

210, 390, 690, 750, 930 μm
IN ORDER OF SMALLER SIZE OF DIAMETER

LIGHT SCANNING DEVICE AND IMAGE FORMING APPARATUS

CROSS-REFERENCE TO THE RELATED APPLICATION

This application is based on and claims the priority benefit of Japanese Patent Application No. 2007-111945, filed on Apr. 20, 2007, the disclosure of which is incorporated herein by reference in its entirety.

BACKGROUND OF THE INVENTION

1. Field of the Invention

The present invention relates to a light scanning device used for a digital copying machine, a laser printer, a laser plotter, a laser facsimile, a laser measuring device, laser processing equipment, and the like. In particular, the present invention relates to a light scanning device having an element with which asymmetry in a curve representing the relationship between a beam spot diameter and a defocus is corrected, and an image forming apparatus, such as a digital copying machine, a laser printer, a laser plotter, a laser facsimile or a multiple function processing machine, which includes the light scanning device and is capable of forming a favorable image.

2. Description of Related Art

Recently, miniaturization of a light scanning device has been demanded along with a demand to miniaturize an image forming apparatus, such as a monochrome or color digital copying machine or a laser printer, which uses the light scanning device therein.

The reduction in variation in a beam spot diameter on a scanned surface has been also demanded along with a demand for reducing variation in dot size in an output image so as to improve the resolution of an output image.

In general, in a light scanning device used for an image forming apparatus, the following steps are performed to form a latent image: a luminous flux emitted from a light source enters a deflector (e.g., a light deflector such as a polygon mirror, a pyramidal mirror or a vibration mirror) via an optical system such as a coupling lens; the luminous flux deflected with this deflector is focused via a scanning lens, for example, and irradiated on a scanned surface (e.g., a photosensitive body or the like); and the tiny spot light beam scans the scanned surface. However, the elements of semiconductor lasers used as light sources in such light scanning devices have variation in an angle of divergence, and this variation induces a difference in the effective number of aperture stops (NA) among optical systems in the light scanning devices. As a result, there have been problems that a beam spot diameter varies among devices, or among colors in the case of outputting a color image, and that the size of a beam spot diameter is increased.

In order to avoid such problems, an aperture stop is disposed on a light path from a laser light source to a deflector, and regulates the width of a luminous flux emitted from the laser light source to guide the luminous flux with the regulated width to an image surface.

However, when the distance between a light source and a deflector is made shorter so as to miniaturize a light scanning device, a position of an aperture stop becomes so close to a scanned surface that asymmetry of in a curve representing the relationship between a beam spot diameter and a defocus (this curve is simply called "the beam spot diameter vs. defocus curve" hereinbelow) is induced as schematically shown in FIG. 5. This asymmetry has produced a problem that a variation in dot size in an output image tends to occur since the beam spot diameter is likely to vary when the beam is defocused.

SUMMARY OF THE INVENTION

A first object of the present invention is to provide a light scanning device having an element with which asymmetry in the beam spot diameter vs. defocus curve is checked (corrected).

A second object thereof is to provide an image forming apparatus which includes the above light scanning device and is capable of preventing a variation in dot size in an output image and the like, and thereby of forming a favorable image.

To achieve the aforementioned first object, a light scanning device according to an embodiment of the present invention includes: a light source; an aperture stop configured to regulate a width of a light beam emitted from the light source; a deflector configured to deflect and scan the light beam emitted from the light source; at least one scanning lens configured to form an image on a scanned surface from the light beam thus deflected and scanned; and a phase-type optical element.

A phase modulation portion is provided to at least a portion of the phase-type optical element, and a phase difference between a phase on the phase modulation portion and a phase on a region, of the phase-type optical element, other than the phase modulation portion is different from $\pi$ [radian].

To achieve the aforementioned second object, an image forming apparatus according to an embodiment of the present invention includes: an image supporter; a light scanning device configured to irradiate the image supporter with a light beam, and thereby to form an electrostatic latent image; a development device configured to visualize, using a developer, the electrostatic latent image formed on the image supporter by the light scanning device; and a transcription device configured to transcribe an image, visualized on the image supporter, on a transcription medium directly or through an intermediate transcription body. This image forming apparatus outputs an image, and includes the light scanning device of the present invention for the above first object, as the light scanning device for this second object.

BRIEF DESCRIPTION OF THE DRAWINGS

FIG. 4 is an explanatory view illustrating an example of a phase-type optical element;

FIG. 5 is an explanatory view of asymmetry in the beam spot diameter vs. defocus curve;

FIG. 12 is a view illustrating another example of a structure of a conventional diffraction lens used for a coupling lens;

FIGS. 13A to 13C are views illustrating an embodiment of an optical element in which a phase-type optical element is integrated in a diffraction lens having the same structure as that of FIGS. 11A to 11C;

FIGS. 21A to 21C are views illustrating another embodiment of an optical element in which a phase-type optical element is integrated in a diffraction lens having the same structure as that of FIGS. 11A to 11C;

FIG. 25A is a view illustrating a structure of the depth enlarging element and a phase distribution thereof; FIG. 25B is a view illustrating a beam profile on a focal position in the case where the depth enlarging element illustrated in FIG. 25A is provided in the optical system in FIG. 23; and FIG. 25C is a view illustrating the beam spot diameter vs. defocus curve;

FIG. 26A is a view illustrating a structure of the depth enlarging element and a phase distribution thereof; FIG. 26B is a view illustrating a beam profile on a focal position in the case where the depth enlarging element illustrated in FIG. 26A is provided in the optical system in FIG. 23; and FIG. 26C is a view illustrating the beam spot diameter vs. defocus curve;

FIG. 27A is a view illustrating a structure of the depth enlarging element and a phase distribution thereof; FIG. 27B is a view illustrating a beam profile on a focal position in the case where the depth enlarging element illustrated in FIG. 27A is provided in the optical system in FIG. 23; and FIG. 27C is a view illustrating the beam spot diameter vs. defocus curve;

FIG. 28A is a view illustrating a structure of the depth enlarging element and a phase distribution thereof; FIG. 28B is a view illustrating a beam profile on a focal position in the case where the depth enlarging element illustrated in FIG. 28A is provided in the optical system in FIG. 23; and FIG. 28C is a view illustrating the beam spot diameter vs. defocus curve;

FIG. 29A is a view illustrating a structure of the depth enlarging element and a phase distribution thereof; FIG. 29B is a view illustrating a beam profile on a focal position in the case where the depth enlarging element illustrated in FIG. 29A is provided in the optical system in FIG. 23; and FIG. 29C is a view illustrating the beam spot diameter vs. defocus curve;

FIG. 30A is a view illustrating a structure of the depth enlarging element and a phase distribution thereof; FIG. 30B is a view illustrating a beam profile on a focal position in the case where the depth enlarging element illustrated in FIG. 30A is provided in the optical system in FIG. 23; and FIG. 30C is a view illustrating the beam spot diameter vs. defocus curve;

FIG. 32A is a view illustrating a shape of an aperture stop; and FIG. 32B is a view illustrating an optical device in which a phase-type optical element and a depth enlarging element are integrated;

DETAILED DESCRIPTION OF THE PREFERRED EMBODIMENTS

Preferred embodiments of the present invention will be described in detail hereinafter with reference to the accompanying drawings.

Embodiment 1

Figure 1:
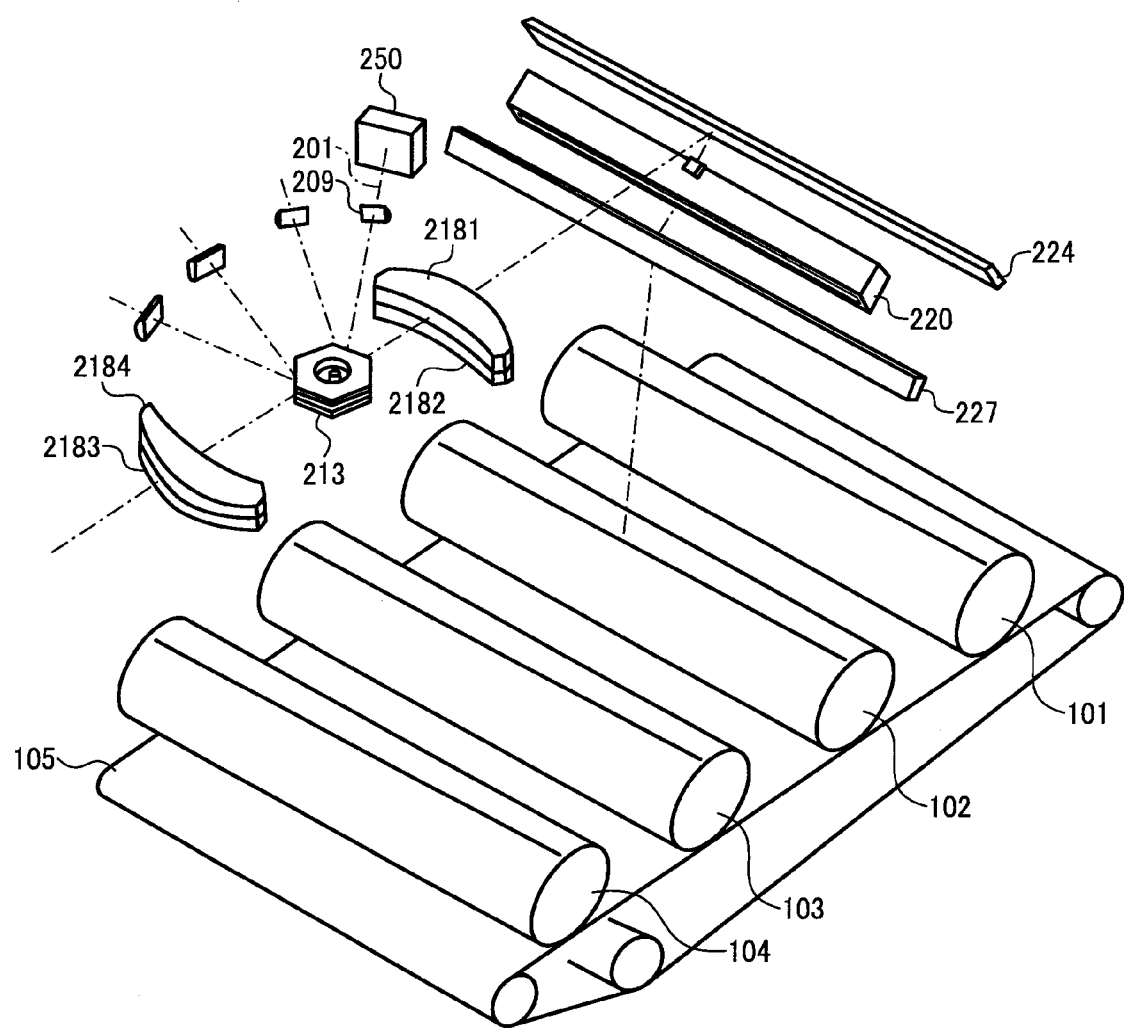
FIG. 1 is a perspective view illustrating a schematic configuration of a light scanning device applied to a full color image forming apparatus according to Embodiment 1 of the present invention.
Figure 2:
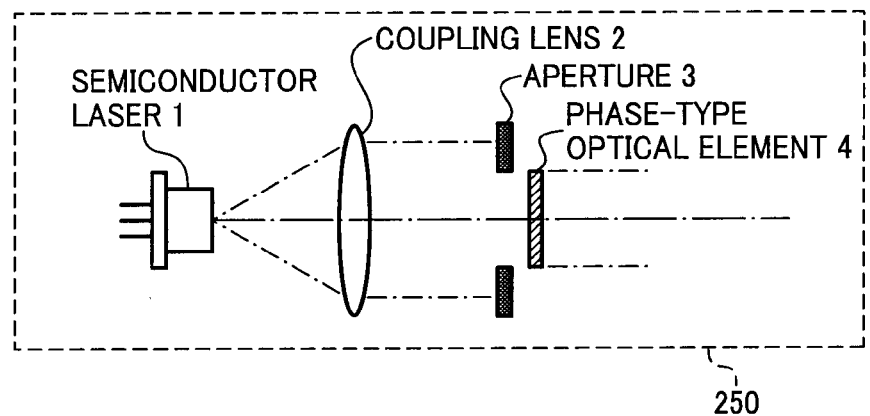
FIG. 2 is an enlarged sectional view illustrating a schematic configuration of a light source unit in a light scanning device shown in FIG. 1.

First, Embodiment 1 of a light scanning device according to the present invention will be described with reference to FIGS. 1 to 3. FIG. 1 illustrates a light scanning device applied to a full color image forming apparatus. In this embodiment, the light scanning device includes: a light source unit 250; a deflector (light deflector) 213 which deflects and scans a light beam from the light source unit; and first scanning lenses 2181 to 2184 which form images on scanned surfaces (photosensitive bodies) 101 to 104 using the scanned beam scanned by the light deflector. In this embodiment, scanning is performed for two stations each time in a direction facing a polygon mirror which is an example of the light deflector 213. In FIG. 1, as to optical systems except the light source unit and the scanning lens, only for one station are shown for the sake of simplicity. FIG. 2 is an enlarged view illustrating a schematic configuration of the light source unit 250 in the light scanning device shown in FIG. 1, and FIG. 3 illustrates a schematic configuration of an optical system, in which process flows following a light deflector (a polygon mirror) of a light scanning device 200 in FIG. 1 are shown.

Figure 3:
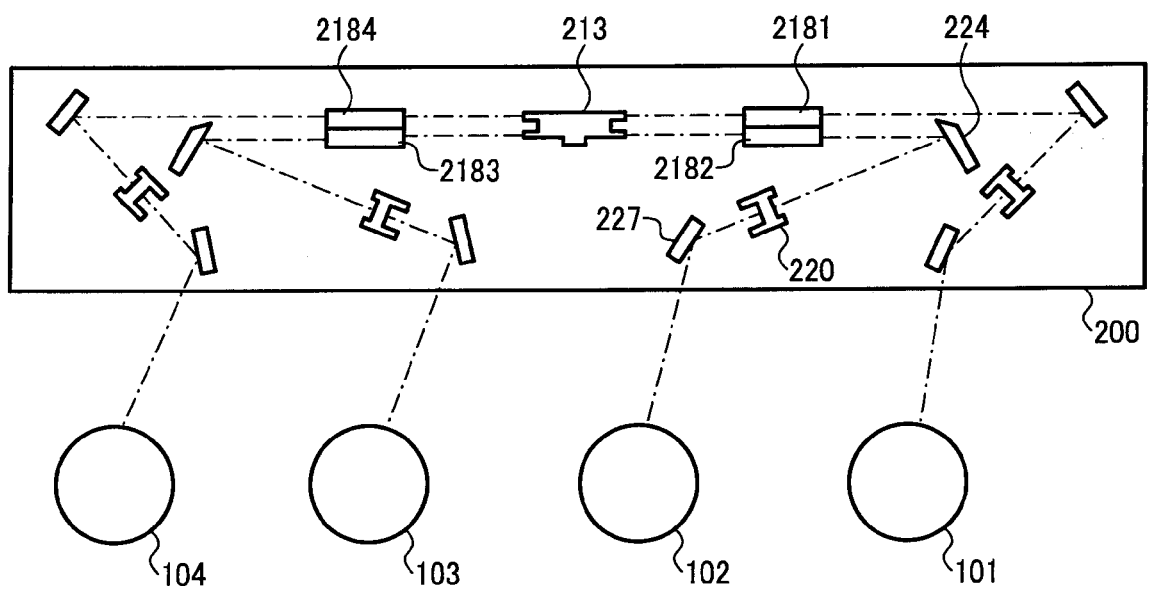
FIG. 3 is a sectional view illustrating a schematic configuration of an optical system, in which process flows following a light deflector (a polygon mirror) in FIG. 1 are shown.

In Embodiment 1 shown in FIGS. 1 to 3, the image forming apparatus in which the four photosensitive drums 101, 102, 103, and 104 are arranged along the moving direction of a transcription belt 105, toner images of different colors are sequentially transcribed and thus a color image is formed, integrates the light scanning devices therein and scans all the light beams with a single polygon mirror 213.

As shown in FIG. 2, the light source unit 250 is composed of a semiconductor laser 1 which is a light source, a coupling lens 2, an aperture stop 3, and a phase-type optical element 4. In the light source unit 250, a light beam emitted from the semiconductor laser 1 is caused to be a substantially parallel beam by the coupling lens 2, cut out into a desired width by the aperture stop 3, and thereafter entered into the phase-type optical element 4 adding a phase distribution to the beam.

The phase-type optical element 4 includes a phase distribution enlarging a depth margin, and is referred to as a depth enlarging element.

Although only one of the light source units 250 is shown in FIG. 1, the four light source units 250 are provided actually so as to correspond to the respective four photosensitive drums 101 to 104. A substantially parallel beam emitted from the respective light source units 250 is caused to be entered into a corresponding cylindrical lens 209, converged into a long line-like shape on a deflection surface of the polygon mirror 213 in the main scanning direction, and thereafter deflected by the polygon mirror 213. At this time, a deflection point of the polygon mirror 213 and the top of the scanned surface (a photosensitive body surface) are caused to be conjugate in the sub scanning direction, whereby an optical face tangle error correction for laser scanning system of the polygon mirror 213 is formed. Note that, the cylindrical lens 209 is designed to have a flat surface on one side, and to have a curvature on the other side in the sub scanning direction only.

In this embodiment, the polygon mirror 213 is configured to have two layers of hexahedron mirrors, each layer having a thickness of approximately 2 mm, and has a shape to further reduce wind-age loss by providing a groove to a part between beams not used for deflection so that the diameter of the groove is somewhat smaller than that of an inscribed circle of the polygon mirror.

The first scanning lenses 2181, 2182, 2183, and 2184 are fθ lenses, for example, and all these fθ lenses have the same shape. Moreover, each of these fθ lenses corresponds to the respective photosensitive drums 101, 102, 103, and 104. Further, the fθ lenses 2181 and 2182 (2183 and 2184) are held so that these lenses pile on each other in the sub scanning direction.

Each of the fθ lenses 2181 to 2184 has a non-arc surface shape with power which allows a beam to move at constant velocity in the main scanning direction on the surface of the corresponding photosensitive drum along with the rotation of the polygon mirror 213, and form an optical face tangle error correction function of the polygon mirror 213 with second scanning lenses (e.g., toroidal lenses) 220 each provided on a light path toward the respective photosensitive drums as shown in FIG. 3. Additionally, on respective light paths from the fθ lenses 2181 to 2184 to the photosensitive drums 101 to 104, light path refraction mirrors 224 and 227 are provided in addition to the above-mentioned toroidal lenses 220.

In this configuration, for example, a light beam passed through the fθ lens 2181 is reflected on the light path refraction mirror 224, entered into the toroidal lens 220, further reflected on the light path refraction mirror 227, before forming an image on the photosensitive drum 101 in the form of a spot and thus creating an image (a latent image) for yellow, for example, as a first light scanning device. In the same manner, a light beam passed through the fθ lens 2182 is reflected on the light path refraction mirror 224, entered into the toroidal lens 220, further reflected on the light path refraction mirror 227, before forming an image on the photosensitive drum 102 in the form of a spot and thus creating an image (a latent image) for magenta, for example, as a second light scanning device; a light beam passed through the fθ lens 2183 is reflected on the light path refraction mirror 224, entered into the toroidal lens 220, further reflected on the light path refraction mirror 227, before forming an image on the photosensitive drum 103 in the form of a spot and thus creating an image (a latent image) for cyan, for example, as a third light scanning device; and a light beam passed through the fθ lens 2184 is reflected on the light path refraction mirror 224, entered into the toroidal lens 220, further reflected on the light path refraction mirror 227, before forming an image on the photosensitive drum 104 in the form of a spot and thus creating an image (a latent image) for black, for example, as a fourth light scanning device. In this way, in this embodiment, the four photosensitive drums can be simultaneously scanned, and images (latent images) of four colors, yellow, magenta, cyan, and black can be simultaneously created with one light deflector (polygon mirror) 213.

As described above, in the light scanning device, multiple sets of light path refraction mirrors 224 and 227 are disposed so that the respective light path lengths from the polygon mirror 213 to the surface of the corresponding photosensitive drum agree with each other and that the respective entering positions and entering angles to each of the corresponding photosensitive drums 101, 102, 103, and 104 arranged at equal intervals become equal to each other.

Further, in the light source unit 250, it is also possible to scan the photosensitive drums with multiple beams by arranging and using the multiple semiconductor lasers 1.

The phase-type optical element 4 is an element having a two-dimensional phase distribution, and can be realized by adding a two-dimensional convex and concave distribution thereto. FIG. 4 shows an example of the phase-type optical element 4. FIG. 4 illustrates that a convex and concave structure in the form of an elliptical ring is formed on a transparent substrate such as quartz, a convex portion represents a phase modulation portion, and is set to have a phase (set as 0 phase in a portion other than the phase modulation portion) other than 1 for a wavelength of an entered light. In addition, the phase modulation portion is provided to a part of the element. Although the region in FIG. 4 is of one convex and concave structure consists of two steps for the sake of simplicity, the region can also be of multiple convex and concave structures, or of a continuous convex and concave structure. It should be noted that, in such a case, it is necessary to set an average phase in the phase modulation portion other than π [radian].

When the aperture stop 3 is located on a front-side principal point in a composite optical system made up of all the scanning lenses and cylindrical lenses, "the beam spot diameter vs. defocus curve", where a defocus is represented in the horizontal axis and a beam spot diameter is represented in the vertical axis, becomes symmetric with a central focus on a focal position. However, when disposing the aperture stop 3 on the position of the front-side principal point of the composite optical system, particularly in the sub scanning direction, the distance between the aperture stop and the light deflector becomes so long that the light scanning device may increase in size. This is because the optical face tangle error correction for laser scanning system is constituted in the sub scanning direction. Meanwhile, when disposing the aperture stop on the side closer to the lens than the position of the front-side principal point, with giving priority to the reduction in the size of the light scanning device, asymmetry (a tilt component) occurs, as shown in FIG. 5, so that variation in a beam spot diameter on a scanned surface by defocusing increases. To solve the above problem, the phase-type optical element 4, as shown in FIG. 4, is usable to correct the asymmetry in "the beam spot diameter vs. defocus curve."

Hereinafter, a specific embodiment is described in which asymmetry in "the beam spot diameter vs. defocus curve" is corrected using the phase-type optical element 4.

EXAMPLE 1-1

Figure 6A:
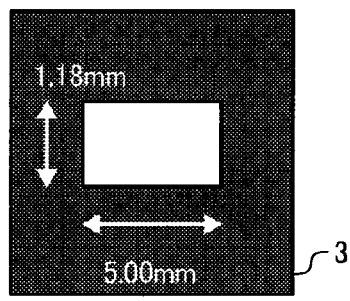
FIGS. 6A to 6C are explanatory views illustrating an example in which asymmetry in the beam spot diameter vs. defocus curve is corrected using an aperture stop and a phase-type optical element.
Figure 6B:
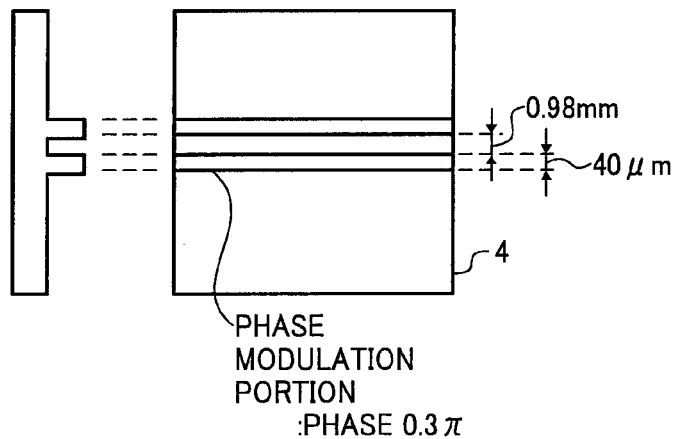

Suppose that the aperture stop 3 is rectangular in shape, as shown in FIG. 6A, a beam spot diameter and defocus curve are compared in the cases where the phase-type optical element 4 shown in FIG. 6B is used and where the phase-type optical element 4 is not used. A result thereof is shown in FIG. 6C.

In this embodiment, it is assumed that the phase-type optical element 4 is integrated with the aperture stop 3 (disposed on the same position as that of the aperture stop). Further, a beam entered into the aperture stop 3 is assumed to be a Gaussian beam, with a main scanning radius (1/e^2) of 6.9 mm, and with a sub scanning radius (1/e^2) of 1.9 mm. As shown in FIG. 6A, the width of the aperture stop is set to 5 mm in the main scanning direction, and 1.18 mm in the sub scanning direction (irrespective of whether or not the phase-type optical element is used).

As shown in FIG. 6B, the phase-type optical element consists of two lines (line width: 40 μm). The pitch between the lines is 0.98 mm, and the lines are symmetric with respect to the center of the aperture stop. A phase of a phase modulation portion is 0.3π [radian] (a phase of a portion other than a phase modulation portion is set to 0).

Figure 6C:
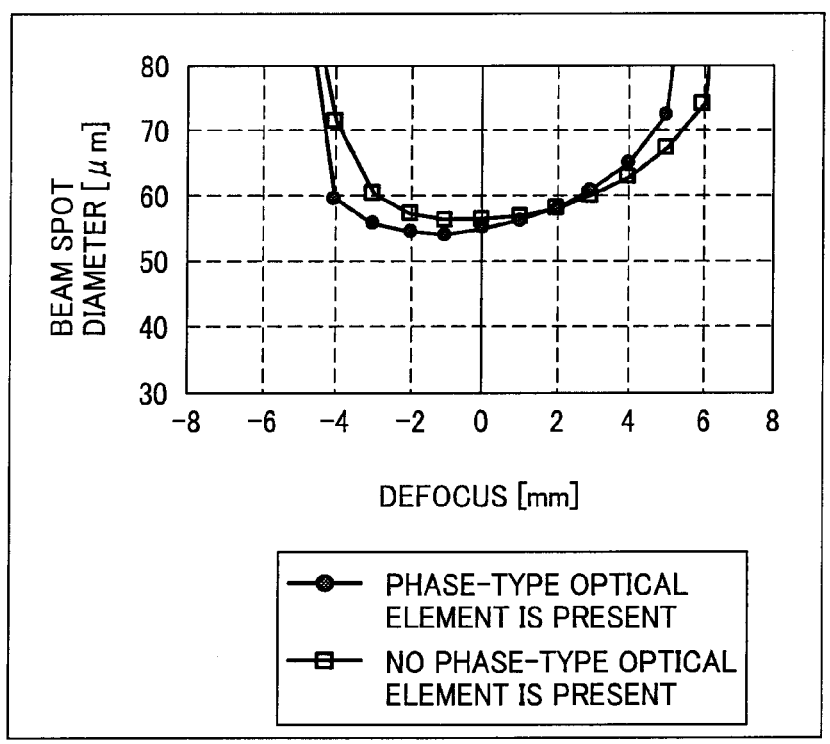

FIG. 6C shows the beam spot diameter vs. defocus curve (in the sub scanning direction). In the drawing, shown by a filled circle is the case where the phase-type optical element 4 is not used, while shown by an outlined square is the case where the phase-type optical element 4 is used.

It can be seen that a correction of a tilt component in the beam spot diameter vs. defocus curve is made and thus asymmetry therein is corrected by use of the phase-type optical element 4. In a defocus range of ±3 mm, the variation in the beam spot diameter is between 54.5 μm and 60.9 μm (width: 6.4 μm) in the case where the phase-type optical element 4 is not used, and between 56.3 μm and 60.4 μm (width: 4.1 μm) in the case where the phase-type optical element 4 is used. Accordingly, the variation in the beam spot diameter in the case where the phase-type optical element 4 is used can be said to be reduced.

EXAMPLE 1-2

Figure 7A:
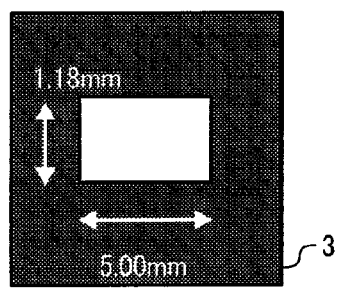
FIGS. 7A to 7C are explanatory views illustrating another example in which asymmetry in the beam spot diameter vs. defocus curve is corrected using an aperture stop and a phase-type optical element.
Figure 7B:
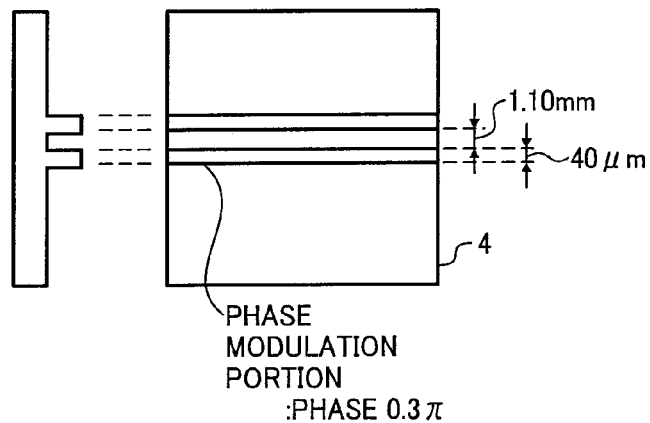

Suppose that the aperture stop 3 is rectangular in shape, as shown in FIG. 7A, a beam spot diameter and defocus curve are compared in the cases where the phase-type optical element 4 shown in FIG. 7B is used and where the phase-type optical element 4 is not used. A result thereof is shown in FIG. 7C.

In this embodiment, it is assumed that the phase-type optical element 4 is integrated with the aperture stop 3. Further, a beam entered into the aperture stop 3 is assumed to be a Gaussian beam, with a main scanning radius (1/e^2) of 6.9 mm, and with a sub scanning radius (1/e^2) of 1.9 mm. As shown in FIG. 7A, the width of the aperture stop is set to 5 mm in the main scanning direction, and 1.18 mm in the sub scanning direction (irrespective of whether or not the phase-type optical element is used).

As shown in FIG. 7B, the phase-type optical element consists of two lines (line width: 40 μm). The pitch between the lines is 1.10 mm, and the lines are symmetric with respect to the center of the aperture stop. A phase of a phase modulation portion is 0.3π [radian] (a phase of a portion other than a phase modulation portion is set to 0).

Figure 7C:
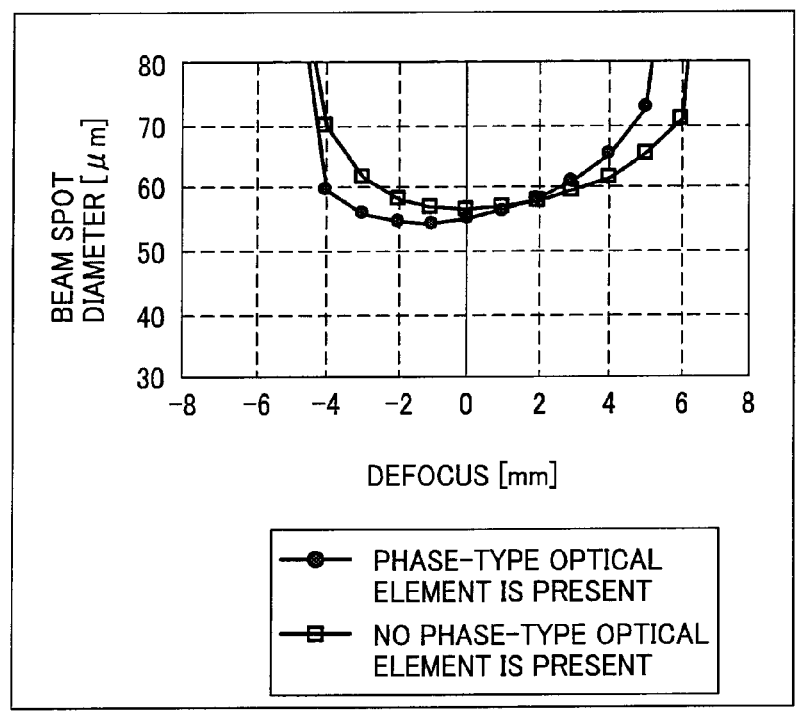

FIG. 7C shows the beam spot diameter vs. defocus curve (in the sub scanning direction). In the drawing, shown by a filled circle is the case where the phase-type optical element 4 is not used, while shown by an outlined square is the case where the phase-type optical element 4 is used.

It can be seen that a correction of a tilt component in the beam spot diameter vs. defocus curve is made and thus asymmetry therein is corrected by use of the phase-type optical element 4. In a defocus range of ±3 mm, the variation in the beam spot diameter is between 54.5 μm and 60.9 μm (width: 6.4 μm) in the case where the phase-type optical element 4 is not used, and between 56.6 μm and 61.7 μm (width: 5.1 μm) in the case where the phase-type optical element 4 is used. Accordingly, the variation in the beam spot diameter in the case where the phase-type optical element 4 is used can be said to be reduced.

EXAMPLE 1-3

Figure 8A:
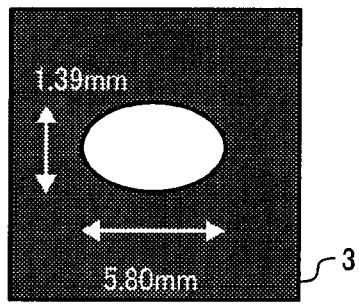
FIGS. 8A to 8C are explanatory views illustrating a further example in which asymmetry in the beam spot diameter vs. defocus curve is corrected using an aperture stop and a phase-type optical element.
Figure 8B:
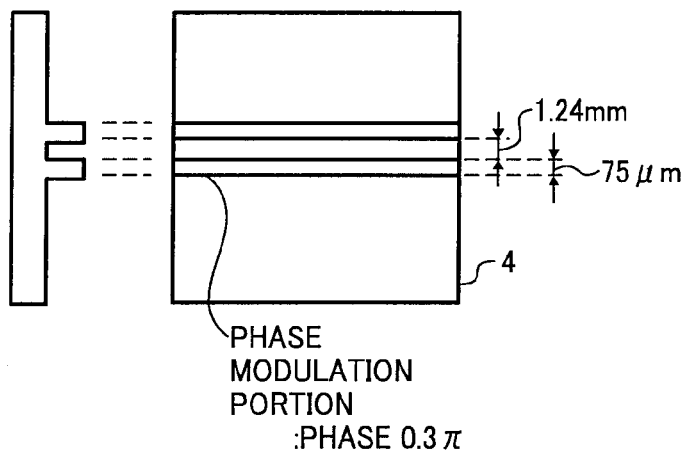

Suppose that the aperture stop 3 is elliptical in shape, as shown in FIG. 8A, a beam spot diameter and defocus curve are compared in the cases where the phase-type optical element 4 shown in FIG. 8B is used and where the phase-type optical element 4 is not used. A result thereof is shown in FIG. 8C.

In this embodiment, it is assumed that the phase-type optical element 4 is integrated with the aperture stop 3. Further, a beam entered into the aperture stop 3 is assumed to be a Gaussian beam, with a main scanning radius (1/e^2) of 6.9 mm, and with a sub scanning radius (1/e^2) of 1.9 mm. As shown in FIG. 8A, the width of the aperture stop is set to 5.80 mm in the main scanning direction, and 1.39 mm in the sub scanning direction (irrespective of whether or not the phase-type optical element is used).

As shown in FIG. 8B, the phase-type optical element consists of two lines (line width: 75 µm). The pitch between the lines is 1.24 mm, and the lines are symmetric with respect to the center of the aperture stop. A phase of a phase modulation portion is 0.3π [radian] (a phase of a portion other than a phase modulation portion is set to 0).

Figure 8C:
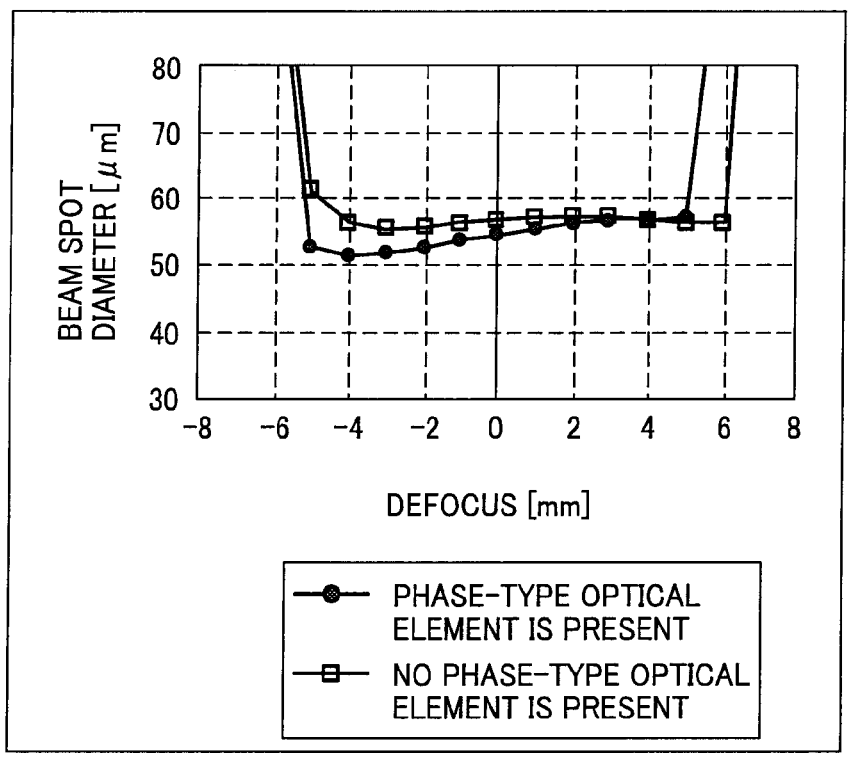

FIG. 8C shows the beam spot diameter vs. defocus curve (in the sub scanning direction). In the drawing, shown by a filled circle is the case where the phase-type optical element 4 is not used, while shown by an outlined square is the case where the phase-type optical element 4 is used.

It can be seen that a correction of a tilt component in the beam spot diameter vs. defocus curve is made and thus asymmetry therein is corrected by use of the phase-type optical element 4. In a defocus range of ±3 mm, the variation in the beam spot diameter is between 51.8 µm and 56.7 µm (width: 4.9 µm) in the case where the phase-type optical element 4 is not used, and between 55.7 µm and 57.2 µm (width: 1.5 µm) in the case where the phase-type optical element 4 is used. Accordingly, the variation in the beam spot diameter in the case where the phase-type optical element 4 is used can be said to be reduced.

EXAMPLE 1-4

Figure 9A:
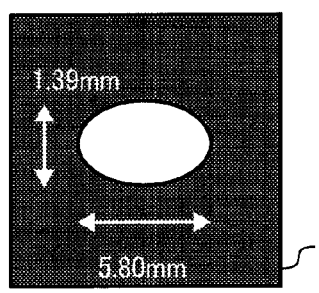
FIGS. 9A to 9C are explanatory views illustrating a further example in which asymmetry in the beam spot diameter vs. defocus curve is corrected using an aperture stop and a phase-type optical element.
Figure 9B:
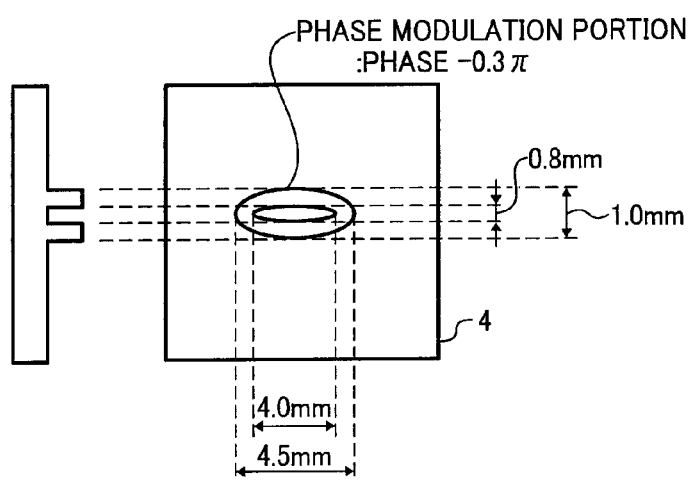
Figure 9C:
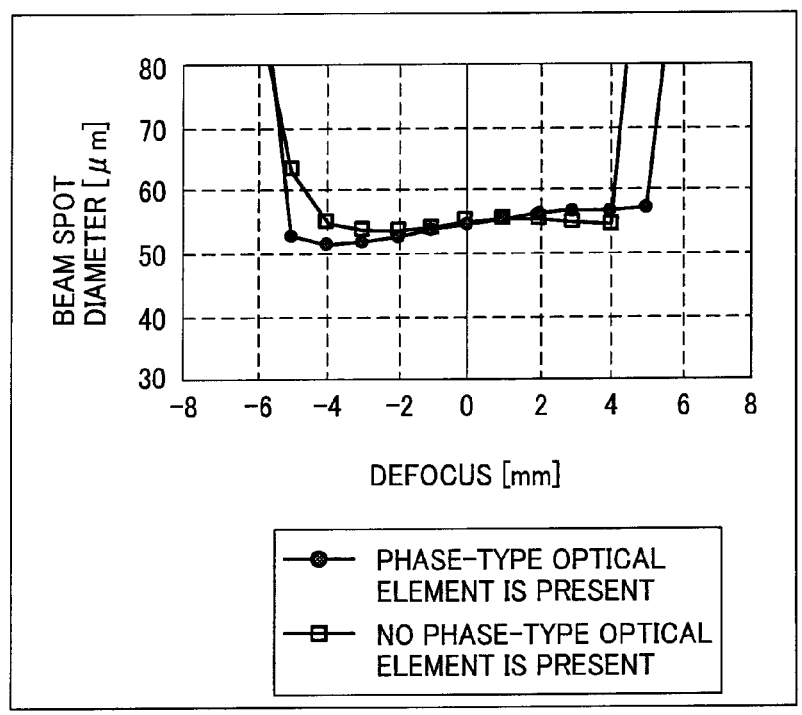

Suppose that the aperture stop 3 is elliptical in shape, as shown in FIG. 9A, a beam spot diameter and defocus curve are compared in the cases where the phase-type optical element 4 shown in FIG. 9B is used and where the phase-type optical element 4 is not used. A result thereof is shown in FIG. 9C.

In this embodiment, it is assumed that the phase-type optical element 4 is integrated with the aperture stop 3. Further, a beam entered into the aperture stop 3 is assumed to be a Gaussian beam, with a main scanning radius (1/e^2) of 6.9 mm, and with a sub scanning radius (1/e^2) of 1.9 mm.

As shown in FIG. 9A, the width of the aperture stop is set to 5.80 mm in the main scanning direction, and 1.39 mm in the sub scanning direction (irrespective of whether or not the phase-type optical element is used).

As shown in FIG. 9B, the phase-type optical element consists of a pattern of an elliptical ring shape. The size of an internal ellipse is a main scanning width×a sub scanning width=4 mm×0.8 mm, and the size of an external ellipse is a main scanning width× a sub scanning width=4.5 mm×1.0 mm. The ellipse is symmetric with respect to the center of the aperture stop. A phase of a phase modulation portion is 0.3π [radian] (a phase of a portion other than a phase modulation portion is set to 0).

FIG. 9C shows the beam spot diameter vs. defocus curve (in the sub scanning direction). In the drawing, shown by a filled circle is the case where the phase-type optical element 4 is not used, while shown by an outlined square is the case where the phase-type optical element 4 is used.

It can be seen that a correction of a tilt component in the beam spot diameter vs. defocus curve is made and thus asymmetry therein is corrected by use of the phase-type optical element 4. In a defocus range of ±3 mm, the variation in the beam spot diameter is between 51.8 µm and 56.7 µm (width: 4.9 µm) in the case where the phase-type optical element 4 is not used, and between 54.0 µm and 55.6 µm (width: 1.6 µm) in the case where the phase-type optical element 4 is used. Accordingly, the variation in the beam spot diameter in the case where the phase-type optical element 4 is used can be said to be reduced.

As described above, since asymmetry in the beam spot diameter vs. defocus curve can be corrected by use of the phase-type optical element 4, the distance from the aperture stop to the light deflector can be reduced. As a result, a light scanning device can be miniaturized while keeping the variation in the beam spot diameter vs. defocus curve at a small level.

It should be noted that, when a phase difference value between the phase modulation portion in the phase-type optical element 4 and a portion other than the phase modulation portion is not π [radian], it is possible to correct asymmetry in the beam spot diameter vs. defocus curve. However, when the phase difference value is close to π [radian], the number of occurrences of high-order diffracted light is increased. For this reason, not only an amount of light of beam (main lobe light) contributed to image formation is reduced, but also the high-order diffracted light may adversely affect an image as a noise light. In order to check the occurrence of the high-order diffracted light to the degree in which there is no problem in practical use, it is preferable to set the above phase difference value (an absolute value) to 0.3π [radian] or less. Further, when the above phase difference value is too small, it becomes impossible to correct asymmetry in the beam spot diameter vs. defocus curve, so it is preferable to set the phase difference value (an absolute value) to 0.1π [radian] or more.

Furthermore, when the above phase modulation portion is disposed in a region close to the center of the aperture stop 3, the high-order diffracted light easily occurs. In order to check the occurrence of the high-order diffracted light, the distance (distances in the main scanning direction and in the sub scanning direction) from the center of the aperture stop 3 to the phase modulation portion is desirably set to 70% or more of the distance (distances in the main scanning direction and in the sub scanning direction) from the center of the aperture stop 3 to a contour of the aperture stop 3, more desirably set to 80% or more thereof, and it is most desirable for the phase modulation portion to be provided in the vicinity of the contour of the aperture stop 3.

When the phase modulation portion of the phase-type optical element 4 has a pattern other than that of "parallel lines in the main scanning direction" such as an elliptical-shaped ring shown in FIG. 9B, an undesirable tilt component is added, while in a small amount, in the beam spot diameter vs. defocus curve in the main scanning direction. In addition, when the shape of the aperture stop 3 is elliptical, an undesirable tilt component is added, while in a small amount, in the beam spot diameter vs. defocus curve in the main scanning direction, even if the phase modulation portion is set to the pattern of the "parallel lines in the main scanning direction". It is more effective in reducing the amount of tilt to provide the phase modulation portion to the outer side as much as possible. Thus, in view of the above point, it is still desirable to provide the phase modulation portion to the outer side as much as possible.

Further, when the area of the phase modulation portion becomes too large, the high-order diffracted light easily occurs. Thus, the area of the phase modulation portion is desirably set to 20% or less of the area of the opening of the aperture stop 3, or more desirably set to 10% or less thereof. Further, for the correction of asymmetry in the beam spot diameter vs. defocus curve, it is necessary to have 3% or more thereof. Incidentally, in each of Embodiments 1-1 to 1-4, the respective ratios of the area of the phase modulation portion in the phase-type optical element 4, to the area of the opening of the aperture stop 3 are as follows: 6.8% in Embodiment 1-1; 6.8% in Embodiment 1-2; 4.2% in Embodiment 1-3; and 12.6% in Embodiment 1-4.

Embodiment 2

Next, Embodiment 2 of the present invention will be described.

The phase-type optical element 4 described in the above Embodiment 1 is provided between the light source 1 and the light deflector 213 so that the same phase distribution can be added to beams of all the image heights. Thus, for all the image heights, a correction can be made to asymmetry in "the beam spot diameter vs. defocus curve."

Embodiment 3

Subsequently, Embodiment 3 of the present invention will be described.

Figure 10:
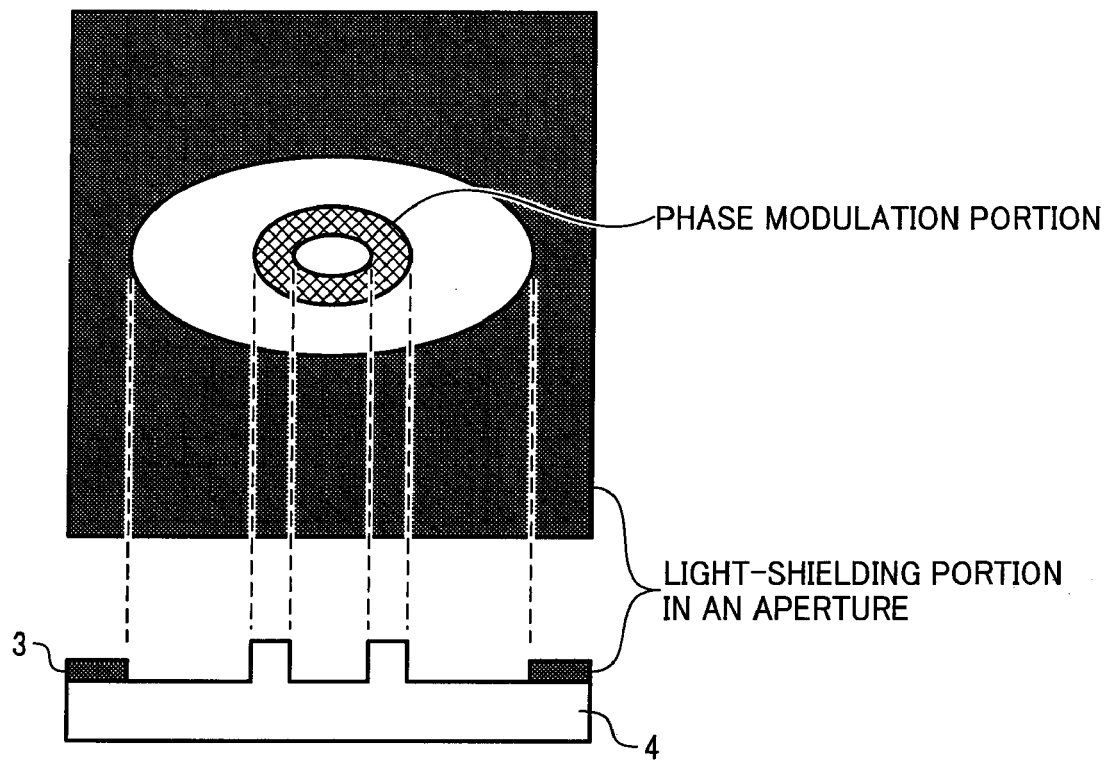
FIG. 10 is a view illustrating an example of an optical element in which a phase-type optical element and an aperture stop are integrated.

FIG. 10 shows an embodiment of an optical element in which the phase-type optical element 4 and the aperture stop 3 described in the above Embodiment 1 are integrated.

As shown in FIG. 10, it is preferable to integrate the phase-type optical element 4 into the aperture stop 3, so that it is possible to check the reduction in a correction effect of asymmetry in "the beam spot diameter vs. defocus curve," which occurs due to the phase-type optical element 4 and/or the aperture stop 3 being out of their proper position. In addition, it is also possible to reduce the number of components and the cost thereof.

Embodiment 4

Further subsequently, Embodiment 4 of the present invention will be described.

The phase-type optical element 4 described in the above Embodiment 1 can also be integrated into the coupling lens 2 of the light source unit 250 shown in FIG. 2. When the coupling lens 2 is made of glass, the phase-type optical element 4 can be integrated into the coupling lens 2 by forming or sticking a resin made phase-type optical element on the coupling lens. When the coupling lens 2 is made of resin, the integration can be achieved by forming the structure of the phase-type optical element in the mold for the coupling lens 2.

Moreover, integration can also be achieved in the case where the coupling lens 2 is replaced by a diffractive lens. The description thereof is provided below.

Figure 11A:
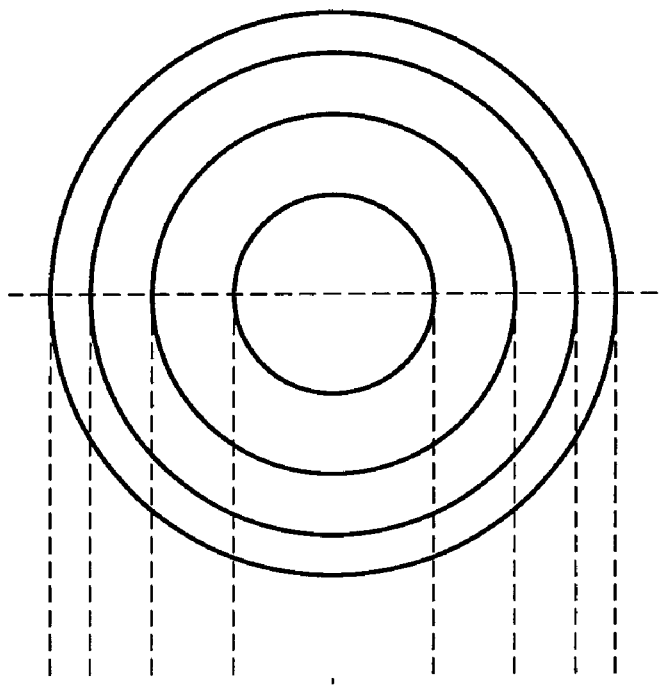
FIGS. 11A to 11C are views illustrating an example of a structure of a conventional diffraction lens used for a coupling lens.
Figure 11B:
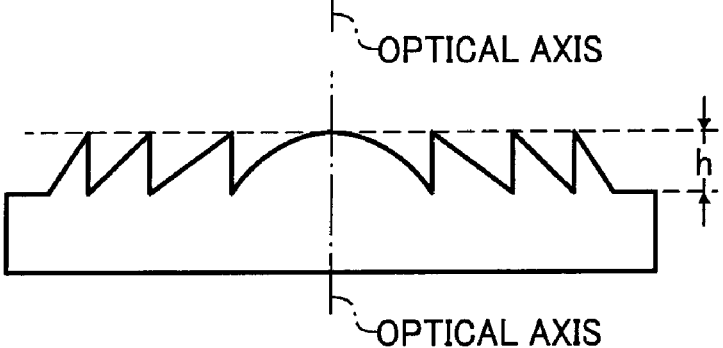
Figure 11C:
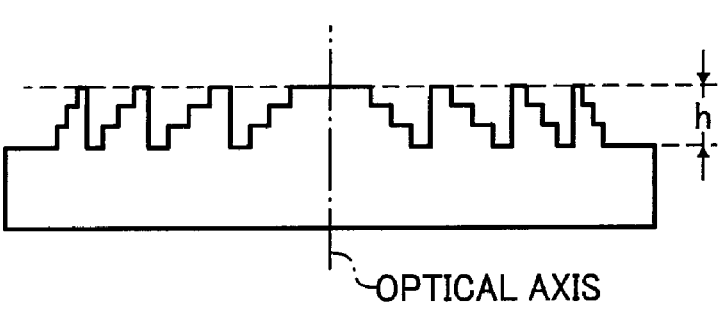

Prior to the description of the embodiment, a structural example of a conventional diffractive lens (a type of having power) is shown in FIGS. 11A to 11C for the reference. A view on the upper part of the drawing is a plan view in which an optical surface of the diffractive lens is viewed from the front. FIGS. 11A to 11C are sectional views at the center of the diffractive lens.

FIG. 11A shows a structure in which the shape of a usual lens is divided into zones, and each zone is folded back so as to have a height h. FIG. 11B shows a shape (a saw-toothed waveform shape) in which the zones in FIG. 11A are approximated by lines, and FIG. 11C shows a state in which the zones in FIG. 11A are approximated by step-like structures. The structures in FIGS. 11A to 11C have power, and are capable of converging (or diverging) entered beams.

Additionally, a structural example of a diffractive lens not having power is shown in FIG. 12. A view on the upper part of the drawing is a plan view in which an optical surface of the diffractive lens is viewed from the front, and a view on the lower part is a sectional view taken across the center of the diffractive lens. For the diffractive lens not having power, each zone has a shape perpendicular to an optical axis. The height h of each zone in FIGS. 11A to 11C, and FIG. 12 is set to have a phase difference being equal to an integral multiple of $2\pi$ in a medium, for a wavelength to be used. By using such a diffractive lens, a fluctuation of a focal position at the time of temperature change can be checked.

FIGS. 13A to 13C show an embodiment of an optical element in which the phase-type optical element of the present invention is integrated into a diffractive lens having a structure described above. A view on the upper part of the drawing is a plan view in which an optical surface of an optical element 10 is viewed from the front.

Figure 14:
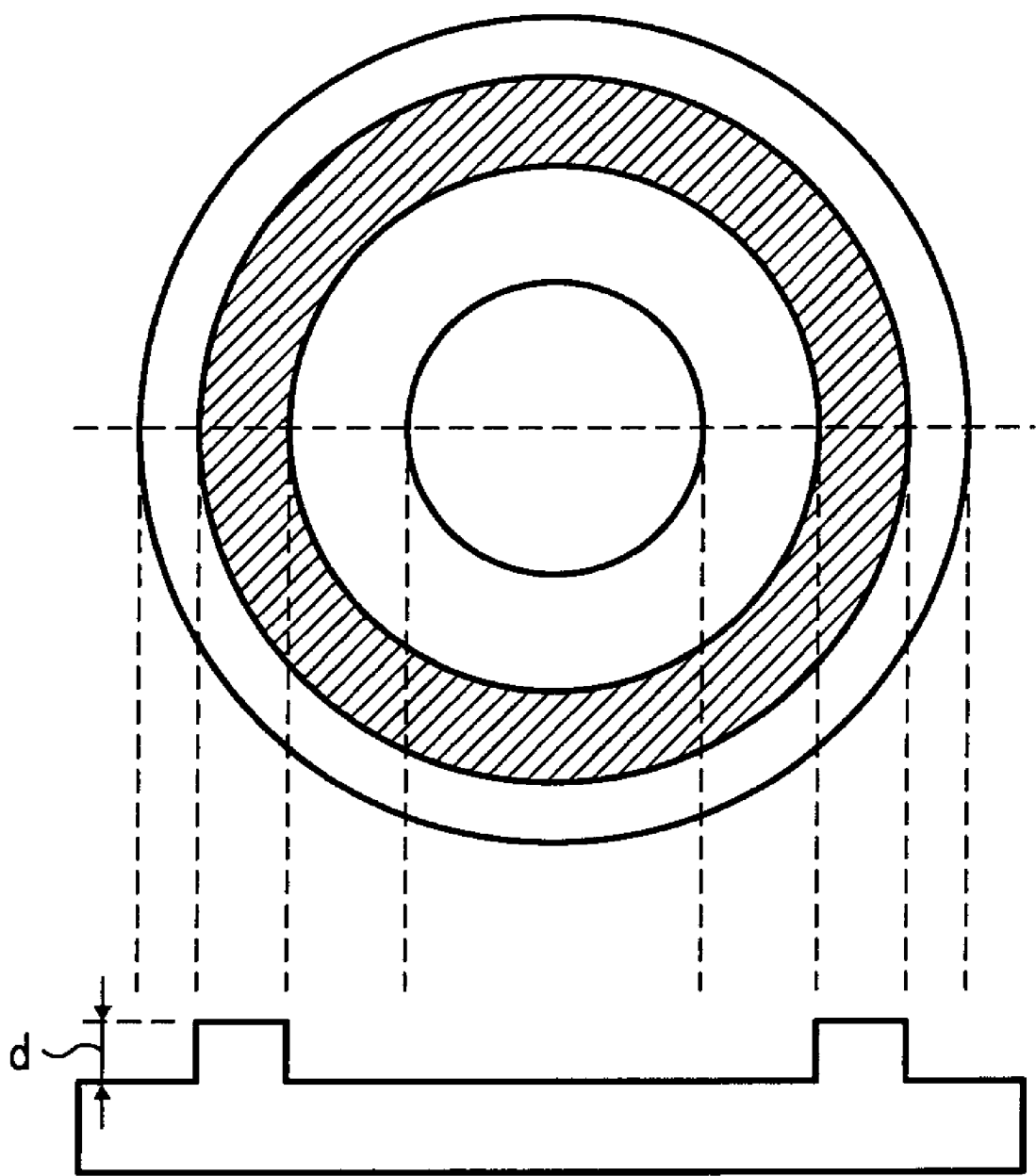
FIG. 14 is a view illustrating a structure of a phase-type optical element assumed in the optical element in FIG. 13.

The drawings of the optical element 10 of the embodiment shown in FIGS. 13A to 13C are each an embodiment in which a phase region 12, corresponding to a portion having a height d, is added to a second zone from the inner side of a diffractive lens 11 having the same structure as each corresponding one of FIGS. 11A to 11C. An assumed shape (a plan view and a sectional view) of the phase-type optical element in this embodiment is shown in FIG. 14.

Figure 15A:
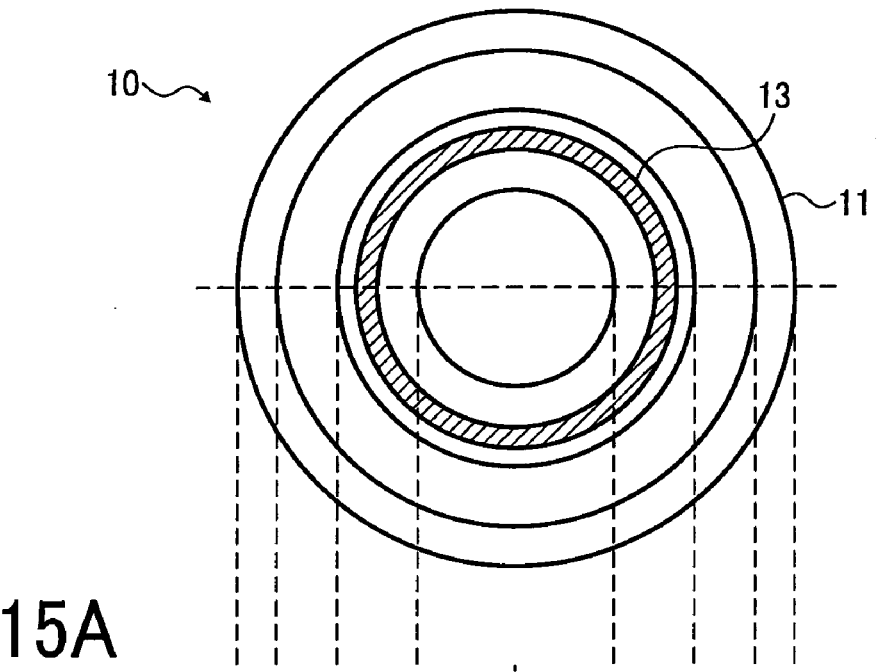
FIGS. 15A to 15C are views illustrating another embodiment of an optical element in which a phase-type optical element is integrated in a diffraction lens having the same structure as that of FIGS. 11A to 11C.
Figure 15B:
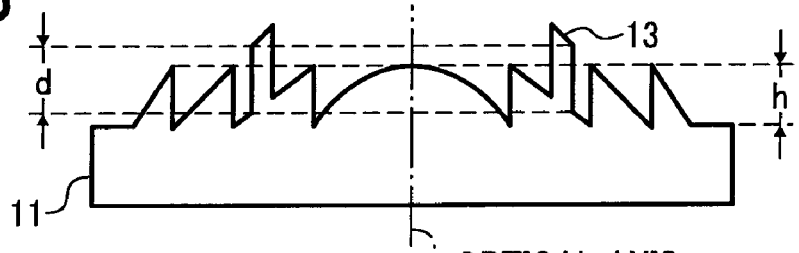
Figure 15C:
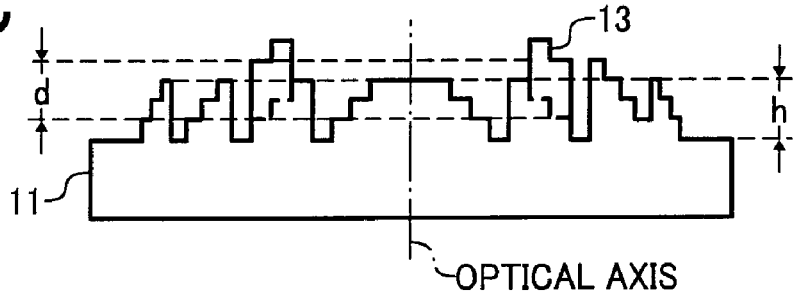

Further, FIGS. 15A to 15C show another embodiment of an optical element in which the phase-type optical element of the present invention is integrated into a diffractive lens. A view on the upper part of the drawing is a plan view in which an optical surface of an optical element 10 is viewed from the front.

Figure 16:
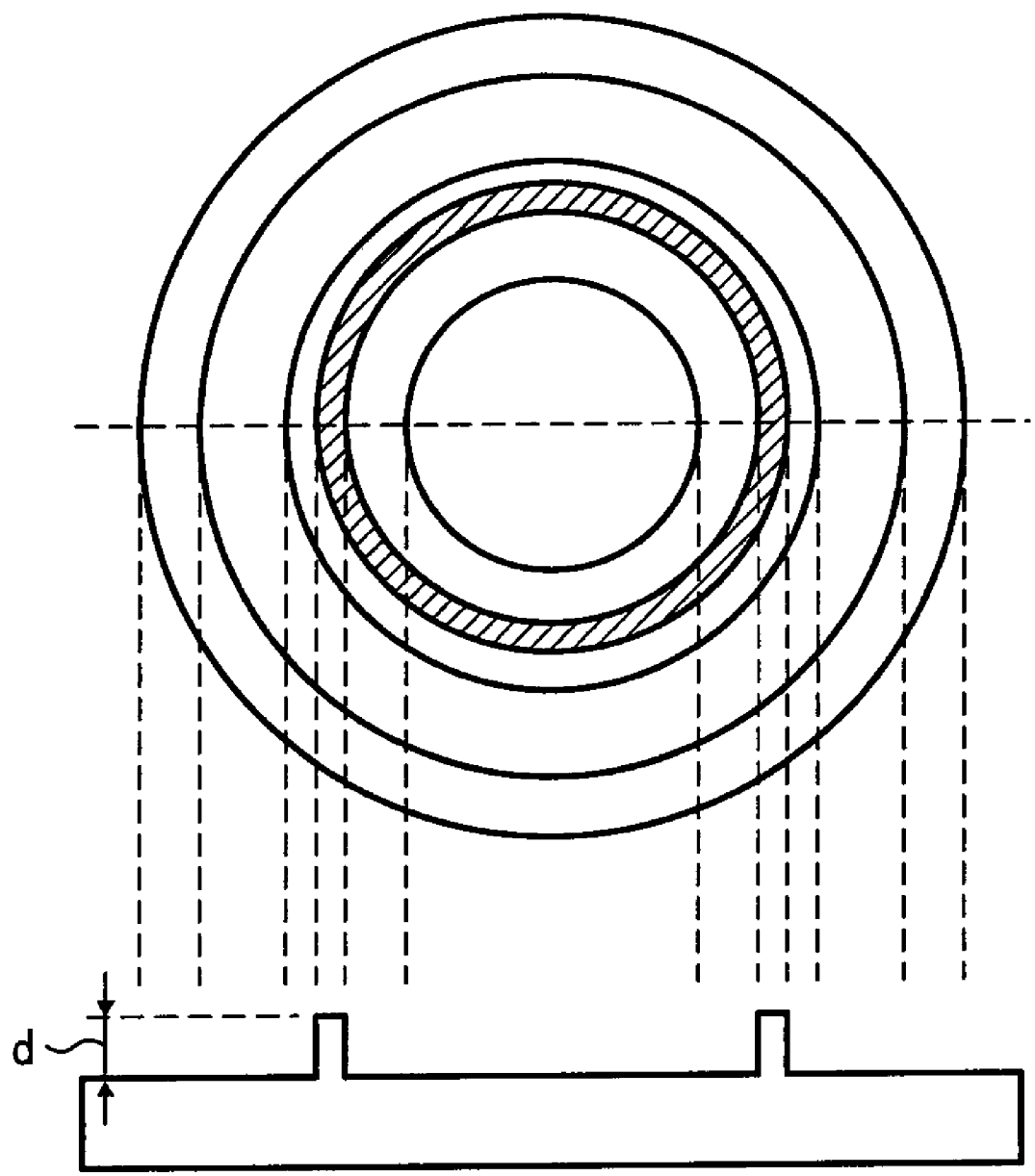
FIG. 16 is a view illustrating a structure of a phase-type optical element assumed in the optical element in FIG. 15.

The drawings of the optical element 10 of the embodiment shown in FIGS. 15A to 15C are each an embodiment in which a phase region 13, corresponding to a portion having a height d, is added to a portion in a first zone from the inner side of a diffractive lens 11 having the same structure as each corresponding one of FIGS. 11A to 11C. An assumed shape (a plan view and a sectional view) of the phase-type optical element in this embodiment is shown in FIG. 16.

In the above embodiments, the phase-type optical element is described using the examples in which the phase-type optical element "corresponds to the zone of the diffractive lens," or is "included in one of zones of the diffractive lens." However, it is also possible to "put the phase-type optical element over multiple zones of the diffractive lens," or to combine all the above three cases.

Incidentally, in the above embodiments, the zones of the diffractive lens are circular in shape, but they may be elliptical.

Embodiment 5

Next, Embodiment 5 of the present invention will be described.

The phase-type optical element 4 described in the above Embodiment 1 can also be integrated into the cylindrical lens 209 of the light scanning device shown in FIG. 1. When using a glass made plane-convex cylindrical lens, the phase-type optical element 4 can be integrated into the glass made plane-convex cylindrical lens by forming or sticking a resin made phase-type optical element on a flat portion thereof. When using a resin made cylindrical lens, the integration can be achieved by forming the structure of the phase-type optical element in the mold for the resin made cylindrical lens.

Further, as in the case of the coupling lens in Embodiment 4, integration of the phase-type optical element can also be achieved in the case where the cylindrical lens is replaced by a diffractive lens. The description thereof is provided below.

Figure 17A:
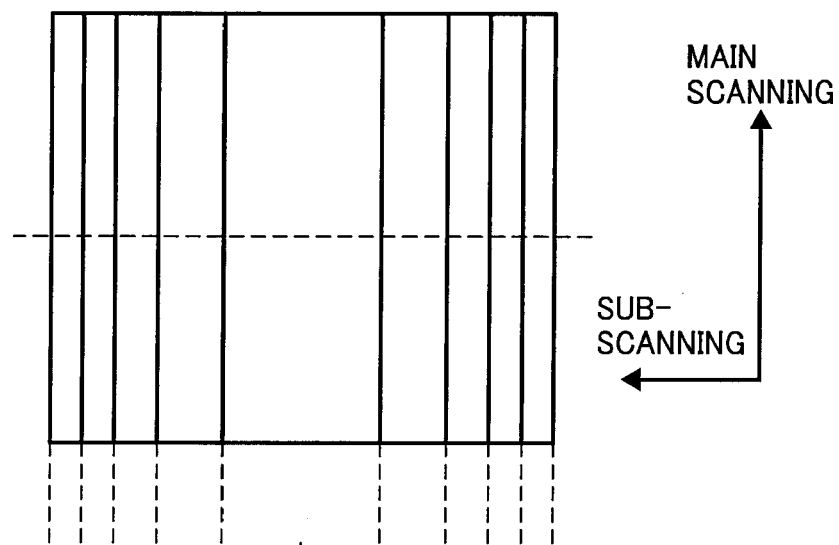
FIGS. 17A to 17C are views illustrating an example of a structure of a conventional diffraction lens used for a cylindrical lens.
Figure 17B:
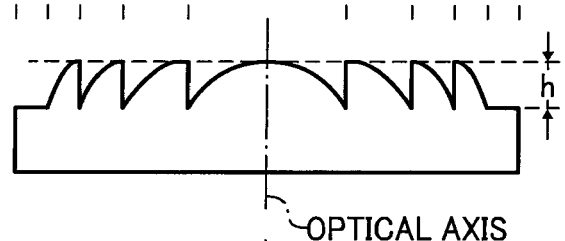
Figure 17C:
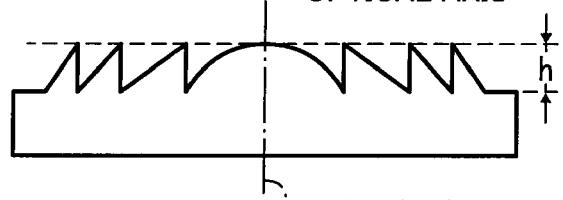

Prior to the description of the embodiment, a structural example of a diffractive lens (a type of having power) used for a conventional cylindrical lens is shown in FIGS. 17A to 17C for the reference. A view on the upper part of the drawing is a plan view in which an optical surface of the diffractive lens is viewed from the front.

FIG. 17A shows a structure in which the shape of a usual lens is divided into zones (in the form of lines), and each zone is folded back so as to have a height h.

FIG. 17B shows a shape (a saw-toothed waveform shape) in which the zones in FIG. 17A are approximated by lines, and FIG. 17C shows a shape in which the zones in FIG. 17A are approximated by step-like structures. The structures in FIGS. 17A to 17C have power, and are capable of converging (or diverging) entered beams in one direction.

Figure 18:
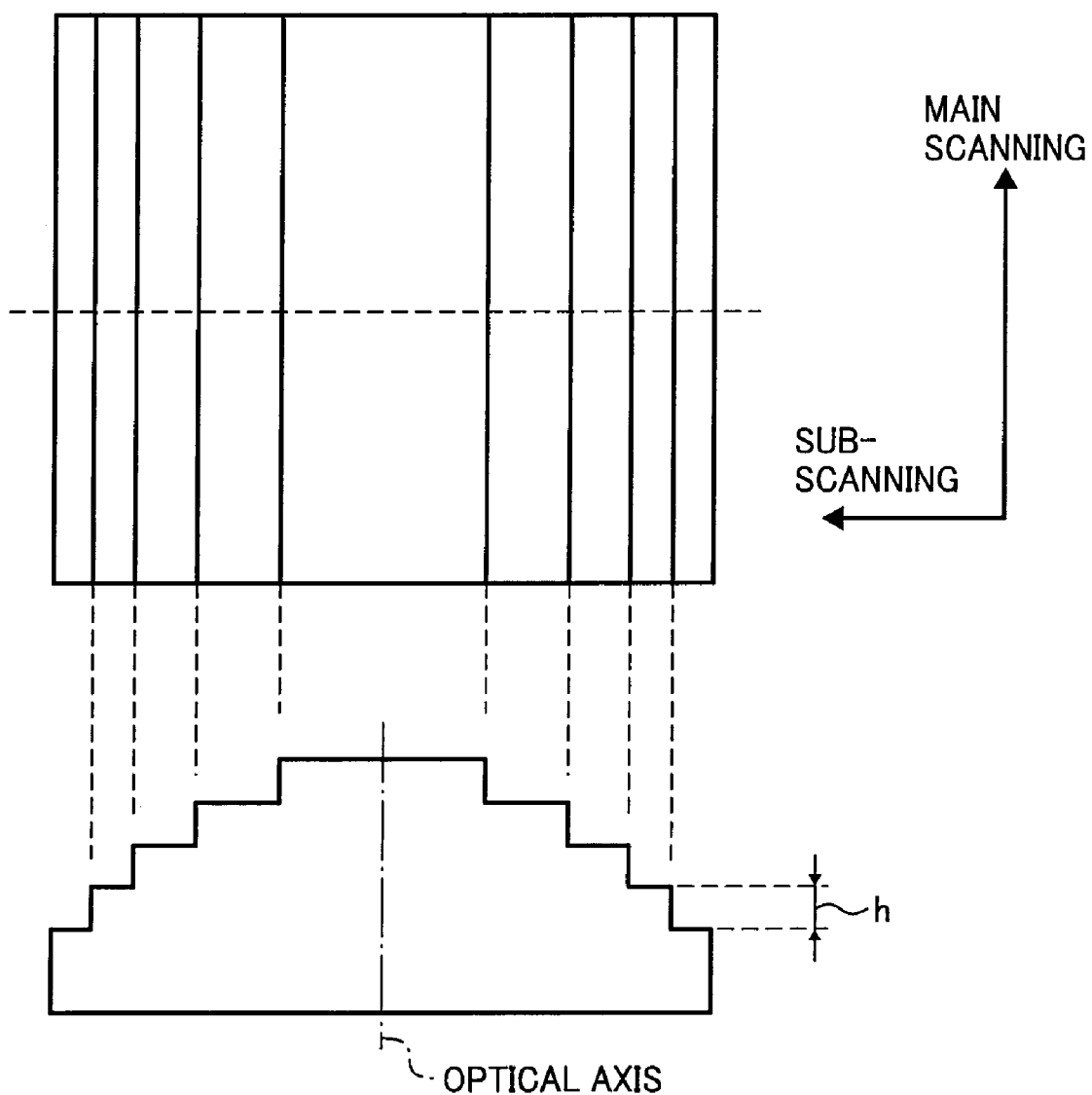
FIG. 18 is a view illustrating another example of a structure of a conventional diffraction lens used for a cylindrical lens.

Additionally, a structural example of a diffractive lens not having power is shown in FIG. 18. A view on the upper part of the drawing is a plan view in which an optical surface of the diffractive lens is viewed from the front, and a view on the lower part is a sectional view taken across the center of the diffractive lens. For the diffractive lens not having power, each zone has a shape perpendicular to an optical axis. The height h of each one of FIGS. 17A to 17C, and FIG. 18 is set to have a phase difference being equal to an integral multiple of $2\pi$, for a wavelength to be used. In this embodiment, by using such a diffractive lens, a fluctuation of a focal position in one direction (in the sub scanning direction) at the time of temperature change can be checked.

Figure 19A:
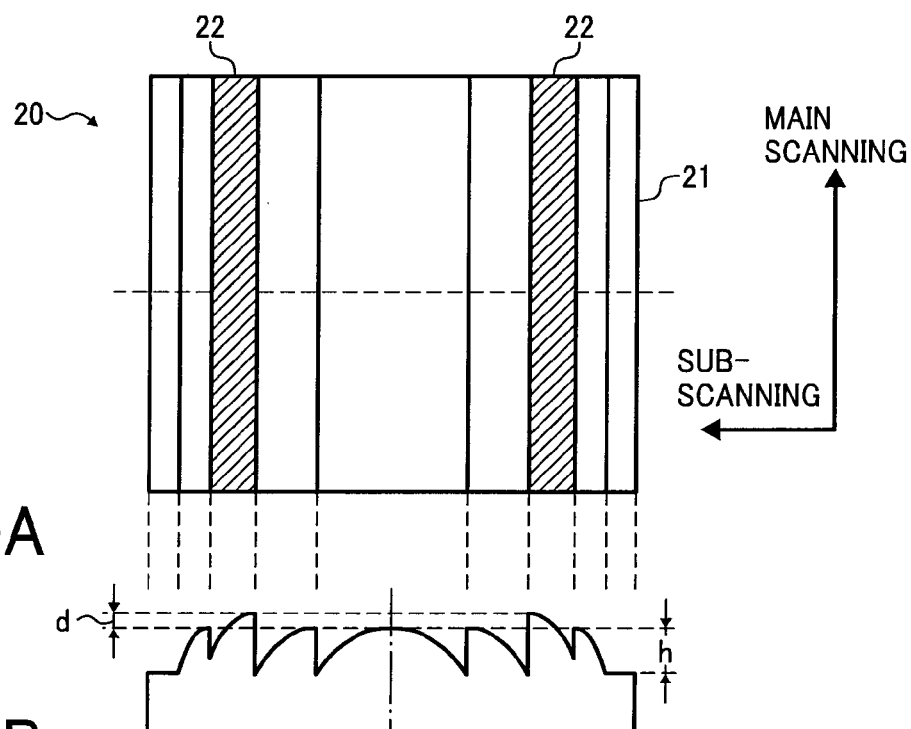
FIGS. 19A to 19C are views illustrating an embodiment of an optical element in which a phase-type optical element is integrated in a diffraction lens having the same structure as that of FIGS. 17A to 17C.
Figure 19B:
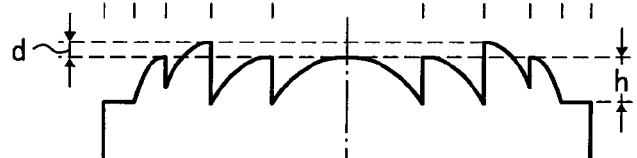
Figure 19C:
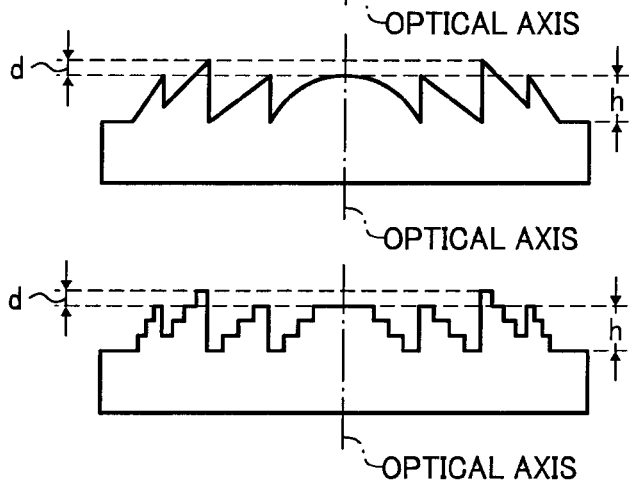
Figure 20:
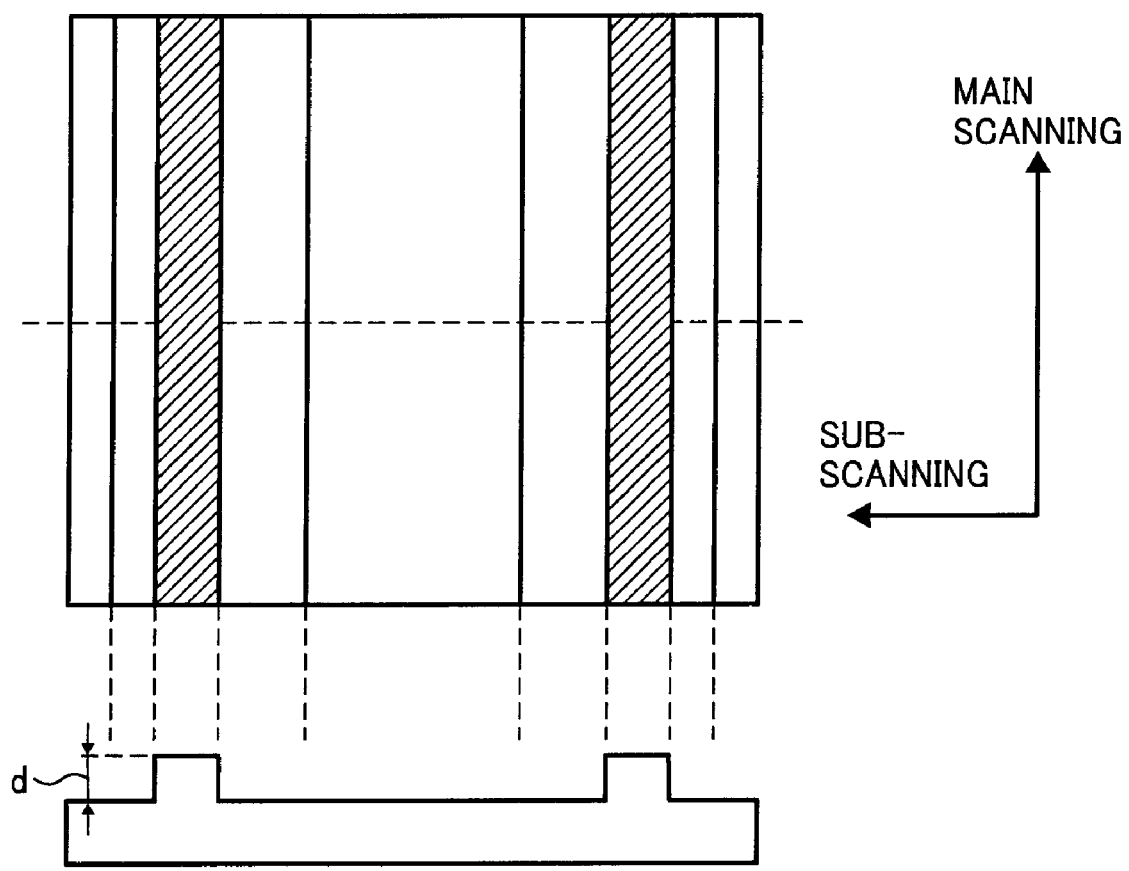
FIG. 20 is a view illustrating a structure of a phase-type optical element assumed in the optical element in FIG. 19.

FIGS. 19A to 19C show an embodiment of an optical element in which the phase-type optical element of the present invention is integrated into a diffractive lens having the same structure as that used in the cylindrical lens described above. A view on the upper part of the drawing is a plan view in which an optical surface of an optical element 20 is viewed from the front, and FIGS. 19A to 19C are each a sectional view taken across the center of the optical element. The drawings of the optical element 20 of the embodiment shown in FIGS. 19A to 19C are each an embodiment in which a phase region 22, corresponding to a portion having a height d, is added to a second zone from the inner side of a diffractive lens 21 having the same structure as that of FIG. 17. An assumed shape (a plan view and a sectional view) of the phase-type optical element in this embodiment is shown in FIG. 20.

Further, FIGS. 21A to 21C show another embodiment of an optical element in which the phase-type optical element of the present invention is integrated into a diffractive lens having the same structure as that of FIG. 17. A view on the upper part of the drawing is a plan view in which an optical surface of an optical element 20 is viewed from the front, and FIGS. 21A to 21C are each a sectional view taken across the center of an optical element.

Figure 22:
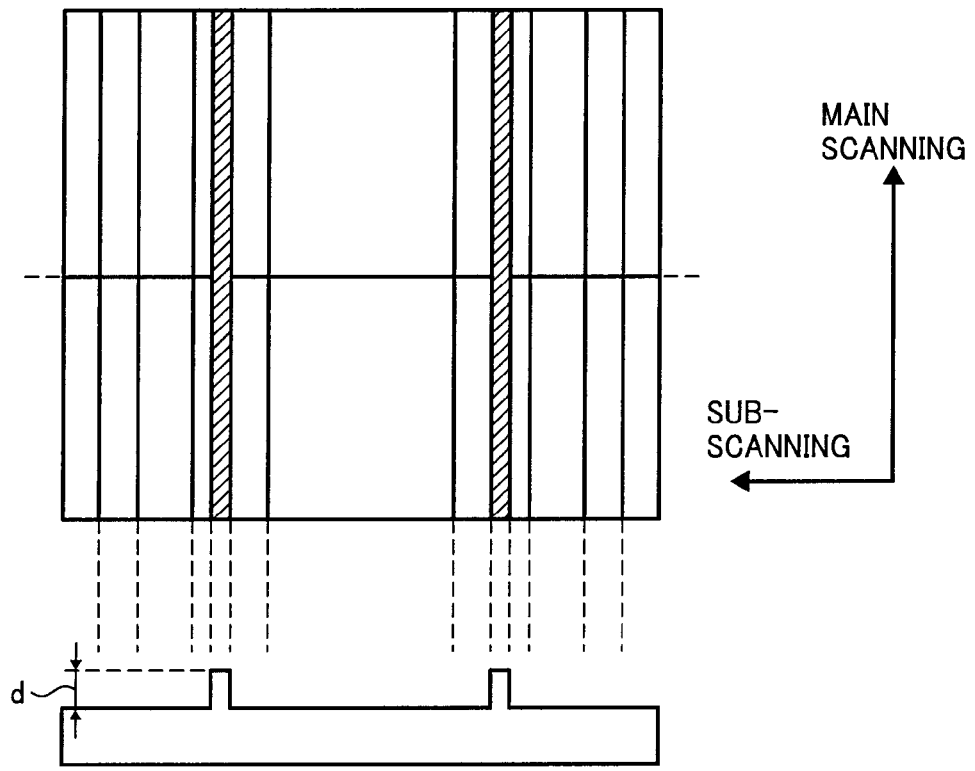
FIG. 22 is a view illustrating a structure of a phase-type optical element assumed in the optical element in FIG. 21.

The drawings of the optical element 20 of the embodiment shown in FIGS. 21A to 21C are each an embodiment in which a phase region 23, corresponding to a portion having a height d, is added to a portion in a first zone from the inner side of a diffractive lens 21 having the same structure as that of FIG. 17. An assumed shape (a plan view and a sectional view) of the phase-type optical element in this embodiment is shown in FIG. 22.

In the above embodiments, the phase-type optical element is described using the examples in which the phase-type optical element "corresponds to the zone of the diffractive lens," or is "included in one of zones of the diffractive lens." However, it is also possible to "put the phase-type optical element over multiple zones of the diffractive lens," or to combine all the above three cases. Moreover, for the description of the phase-type optical element, line shapes have been assumed, but the shape is not limited to this; it is also possible to assume an elliptical shape, or other shape.

Embodiment 6

Subsequently, Embodiment 6 of the present invention will be described.

The phase-type optical element 4 described in the above Embodiment 1 can also be integrated into the scanning lenses 2181 to 2184 of the light scanning device shown in FIGS. 1 and 3. When using a glass made scanning lens, the phase-type optical element 4 can be integrated into the glass made scanning lens by forming or sticking a resin made phase-type optical element on the scanning lens. When using a resin made scanning lens, the integration can be achieved by forming the structure of the phase-type optical element in the mold for the scanning lens.

Further, as in the case of the above Embodiments 4 and 5, integration of the phase-type optical element can also be achieved in the case where the scanning lens is replaced by a diffractive lens.

Meanwhile, in a housing in which scanning lenses of a light scanning device are disposed, a relative positional relationship between a light source and a scanning lens changes from its originally designed state due to various error factors at the time of manufacturing thereof. Moreover, the housing deforms with time due to an influence of such as heat from a light deflector (a polygon mirror or the like), and eventually the relative positional relationship between the light source and the scanning lens changes from its initial state (at the time of manufacturing thereof). Since a position where a beam is entered into a scanning lens moves out of its initial position due to the above factors, a positional relationship between the beam and a phase-type optical element also moves out of its initial state, and this may lead to a reduction in a correction effect of asymmetry in the beam spot diameter vs. defocus curve. In order to check such a reduction in the correction effect, it is preferable to integrate the phase-type optical element on the scanning lens which is closest to the light deflector. In doing so, it is possible to check the change in the relative positional relationship between the beam and the phase-type optical element so that the correction effect can be stably acquired even after a certain time passes.

Embodiment 7

Further subsequently, Embodiment 7 of the present invention will be described.

When the phase modulation portion of the phase-type optical element 4 has a pattern other than that of "parallel lines in the main scanning direction" such as an elliptical-shaped ring shown in FIG. 9B, an undesirable tilt component is added, while in a small amount, in the beam spot diameter vs. defocus curve in the main scanning direction. However, when the pattern of "parallel lines in the main scanning direction" is used, a correction can only be made to "asymmetry in the beam spot diameter vs. defocus curve" in the sub scanning direction.

In a usual light scanning device, a relay optical system is employed in which light is converged once in the sub scanning direction in the vicinity of a light deflector, and consequently, the "asymmetry in the beam spot diameter vs. defocus curve" easily occurs in the sub scanning direction.

In view of the above points, it is preferable to employ the pattern of the parallel lines in the main scanning direction, as the pattern of the phase modulation portion in the phase-type optical element 4, as in FIGS. 6B, 7B, and 8B described in Embodiment 1. In doing so, asymmetry in the beam spot diameter vs. defocus curve in the sub scanning direction can be favorably corrected, and at the same time, little influence is exerted on the beam spot diameter vs. defocus curve in the main scanning direction.

Embodiment 8

Next, Embodiment 8 of the present invention will be described.

This embodiment has a configuration which further includes a phase-type optical element, i.e., a depth enlarging element, having a phase distribution enlarging a depth margin on a scanned surface, in a light scanning device described in Embodiments 1 to 7. The depth enlarging element will be described below.

As a device enlarging a depth margin, a Bessel beam is known. Generation of a rigorous Bessel beam requires an infinitely wide plane wave, so the generation thereof is not possible. However, several methods for generating a pseudo Bessel beam have been proposed such as: the methods using a ring-shaped thin slit (refer to Japanese Patent No. 3507244 and Japanese Patent Application Publication No. Hei 9-064444); the method using an Axicon prism (refer to Japanese Patent Application Publication No. Hei 4-171415); the method using a binary optical element equivalent to an Axicon prism (refer to Japanese Patent Application Publication No. Hei 10-227992). Further, as described in Japanese Patent No. 3920487, a method has been proposed, as another depth margin enlarging method, in which intensity distribution on an exit pupil is converted so that four surrounding angles may become higher than a center portion, using an intensity distribution converting element and/or a phase distribution converting element.

A generation of a Bessel beam or a similar beam is made possible by shielding light near the center of a beam, but a loss of an amount of light is quite large since the central portion of a beam having a high intensity is shielded. In order to avoid this problem, as another method for generating a Bessel bean, a method using an Axicon prism (or a binary optical element equivalent to the Axicon prism) is known. With this method, the above problem on the loss of an amount of light due to the light shielding can be reduced. However, an application of this approach may induce a limitation on layout since a Bessel beam is generated in the vicinity of an Axicon prism. For example, when considering an application to a light scanning device to be used for an image forming apparatus, a Bessel region and a surface not to be scanned are required to be disposed so that they are caused to be conjugate with each other, and some ingenious technique such as adding a further relay optical system is also required. Hence, increase in the number of lenses is induced, and possibly increase in size and cost of an optical system may also be induced.

In addition to the above, a Bessel beam itself presents a problem. A Bessel beam has a side lobe light of very high intensity, and the intensity of a high-order side lobe light is also high (Assuming that an amplitude distribution of an ideal Bessel function (a Bessel function of the first kind of order 0) has been acquired, the intensities of the first and second side lobe light to a main lobe light are high enough to reach approximately 16% and 9%, respectively.). Further, a high-order side lobe light has a large occupied area compared with that of a low-order side lobe light. Accordingly, when the intensity of a high-order side lobe light becomes high, the intensity of a main lobe light becomes reduced to a large degree. Since a main lobe light is used as a signal light, this reduction is equal to substantial reduction in light use efficiency, so the above case is not desirable.

Furthermore, it is not preferable to use a Bessel beam, whose side lobe light is also a noise light, for optical equipment since an excessively high side lobe light may deteriorate the quality of optical equipment. Particularly, since a high-order side lobe light is generated on a position away from an optical axis, it is so spatially separated from a highest peak (a main lobe light) that it easily gives a noise to optical equipment. For example, in using a Bessel beam in a light scanning device of an image forming apparatus, when the peak is on a position away from an optical axis, a thin line may be formed so as to rim dots formed by a main lobe light. The same is true of laser processing equipment and the like.

Because of the above, a Bessel beam is not suitable to the light scanning device of the present invention.

In Japanese Patent No. 3920487, a beam from a semiconductor laser presents a Gaussian distribution, and when causing a Gaussian beam to pass through an aperture stop, intensity at each of the four corners is reduced to a level lower than that of the center. In order to cause the intensity at each of the four corners on an exit pupil to become higher than that at the center using a phase-type optical element and/or a phase distribution converting element, light at the center must be moved to a peripheral part. Accordingly, high-order light easily occurs, and an adverse effect such as scumming of an output image may be exerted when the light scanning device of the present invention is applied to an image forming apparatus. When using only the vicinity of the center of the Gaussian beam, it becomes easy to avoid the high-order light. However, an amount of light to be shielded is increased instead, and thus light use efficiency may be reduced.

Against such a background, the inventors have found a method in which a depth margin can be enlarged with high light use efficiency and with no increase in a beam spot diameter, based on the study thereof. The method is that, a suitable phase distribution is added to an entered beam by using a phase-type optical element (a depth enlarging element) which is designed to increase an intensity of a side lobe peak of a beam profile on a focal position of a scanning lens a little so as not to influence optical equipment. Using this method, the inventors have found that an expansion of a beam spot diameter (an expansion of a main lobe light) at the time when the beam is off the focal position can be checked.

In this embodiment, the depth enlarging element is an element having a two-dimensional phase distribution, and can be acquired, for example, by forming a convex and concave structure on a transparent substrate.

A first ratio is defined as a ratio of peak intensity of a side lobe light to that of a main lobe light in a light intensity profile on a focal position of a scanning lens in the case where a depth enlarging element is provided. A second ratio is defined as a ratio of peak intensity of a side lobe light to that of a main lobe light in a light intensity profile on a focal position of a scanning lens in the case where a depth enlarging element is assumed not to be provided. By setting a phase distribution of the depth enlarging element so that the first ratio is higher than the second ratio, an expansion of a beam spot diameter (an expansion of a main lobe light) at the time when the beam is off the focal position can be checked.

Further, it is preferable that on a non-focal position on an optical axis of a scanning lens which is different from that on the foregoing focal position, a ratio of peak intensity of a side lobe light to that of a main lobe light in a light intensity profile be lower than a ratio of peak intensity of a side lobe light to that of a main lobe light in a light intensity profile in the case where a depth enlarging element is assumed not to be provided.

Furthermore, it is preferable that on a non-focal position on an optical axis of a scanning lens which is different from that on the foregoing focal position, a ratio of peak intensity of a main lobe light in a light intensity profile on a non-focal position to that of a main lobe light in a light intensity profile on the foregoing focal position be higher than a ratio of peak intensity of a main lobe light in peak intensity profile on the foregoing non-focal position to that of a main lobe light in a light intensity profile on the foregoing focal position in the case where a depth enlarging element is assumed not to be provided.

In general, peak intensity of a beam on a position deviated from a focal position is reduced to a level lower than that on the focal position. As described above, when an amount of reduction of the peak intensity on the position deviated from the focal position is checked, an amount of reduction of light energy exposing a photosensitive body can be reduced in using a depth enlarging element in a light scanning device of an image forming apparatus, for example, even when a disposing position of a photosensitive body on a scanned surface varies with time. For this reason, it becomes possible to check a variation of the size of dots with a variation of exposing energy to a small level, and thus to contribute to the enhancement of picture quality of output images.

Simulation results are described below when a depth enlarging element is designed so as to meet the above points.

Figure 23:
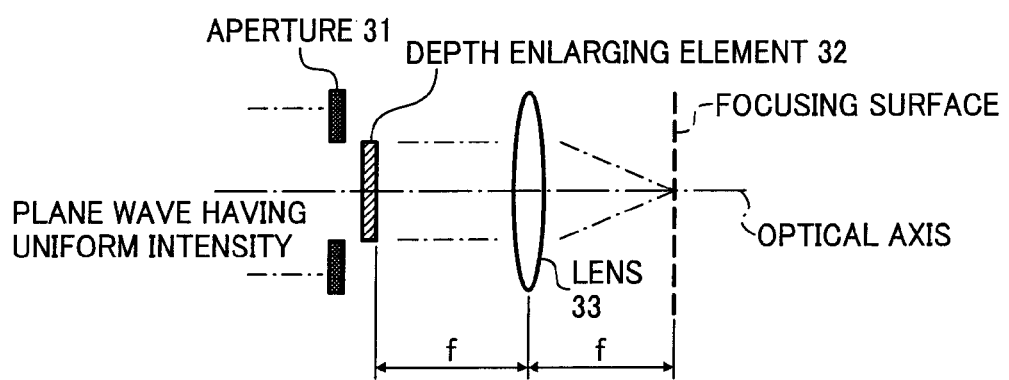
FIG. 23 is a view illustrating an example of an optical system in which a phase-type optical element is used for a depth enlarging element.

An optical system used for the simulations of FIGS. 24 to 30 is as shown in FIG. 23. Although the optical system is different from a light scanning device to be actually used, the real scanning device can have the same effects as those shown below. In this simulation: a plane wave of uniform intensity is used as an incident wave; the beam with the plane wave is cut to have a desired width by an aperture stop 31; a depth enlarging element (a phase-type optical element) 32, which is provided adjacent (distance=0) to the aperture stop 31, adds a desired phase distribution to the beam; and an image is formed on a focal position by an ideal lens 33 at a focal position f. An aperture stop (and the depth enlarging element (phase-type optical element) 32) is provided to a front-side focal position of the lens 33. Parameters thereof are defined as follows.

Aperture stop: A circle shape having a diameter of 930 μm.
Lens: f=50 mm.

It should be noted that, although a description is given of the case where an incident wave has a uniform intensity for the sake of simplicity, an actual intensity distribution of a semiconductor laser or the like represents a Gauss distribution. However, what is described below can also be true of the case where an entered wave is a Gauss beam. This is because a depth margin of the present invention is enlarged by controlling a beam profile on an image surface by way of control of a phase distribution only.

(Case where a Depth Enlarging Element is Not Provided)

Figure 24A:
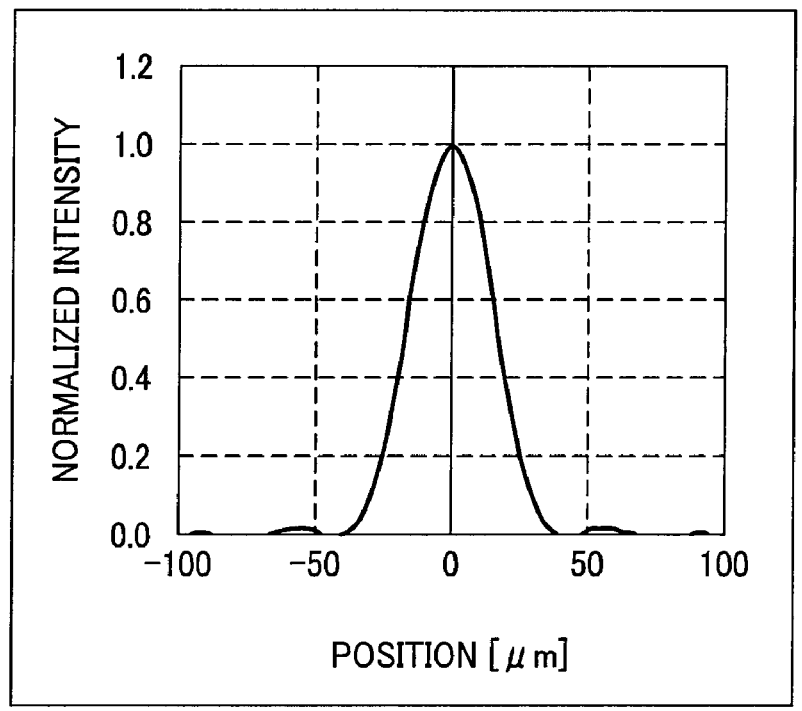
FIGS. 24A and 24B are views respectively illustrating a simulation result of a beam profile on a focal position, and the beam spot diameter vs. defocus curve in the optical system of FIG. 23 in the case where the depth enlarging element is not provided.
Figure 24B:
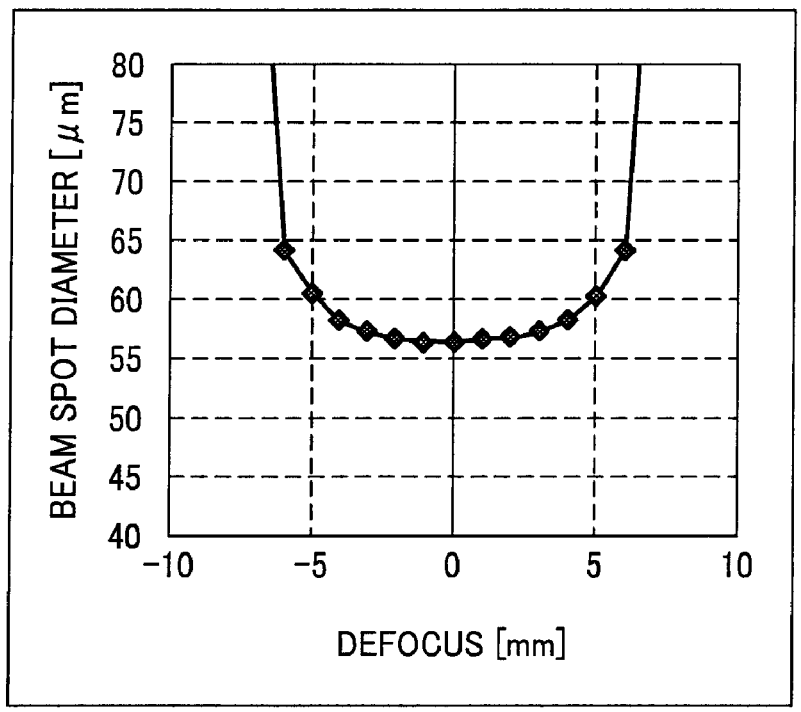
Figure 25A:
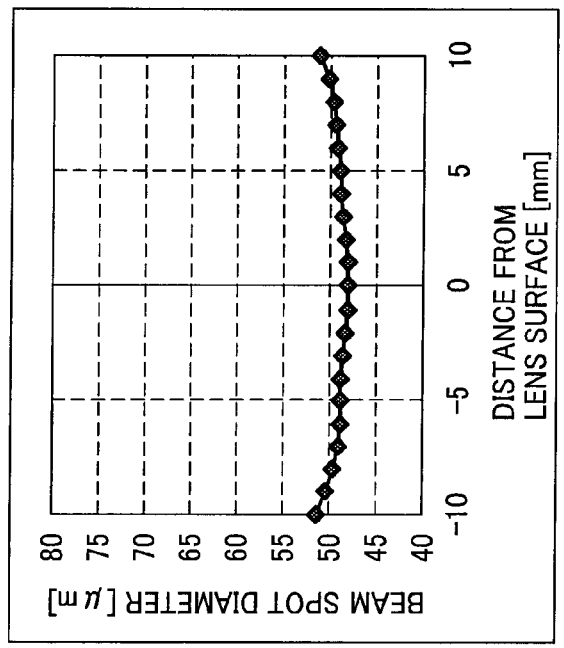
FIGS. 25A to 25C are views illustrating Embodiment 1 (simulation result) in which a depth enlarging element is used.
Figure 25B:
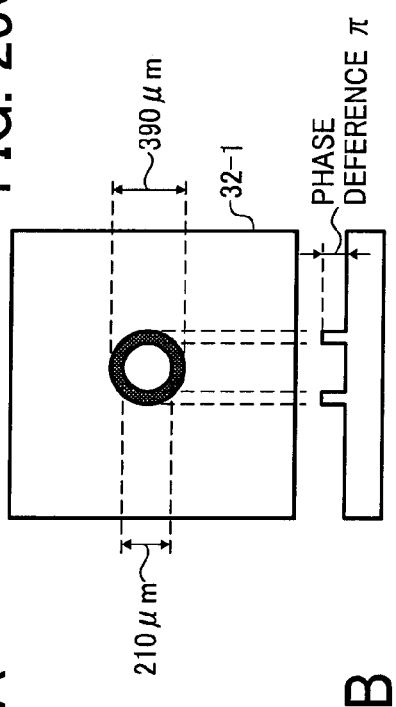
Figure 25C:
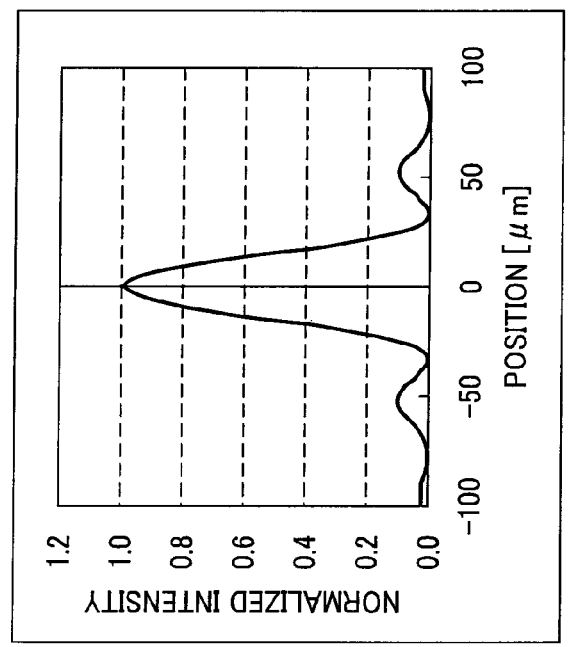
Figure 26C:
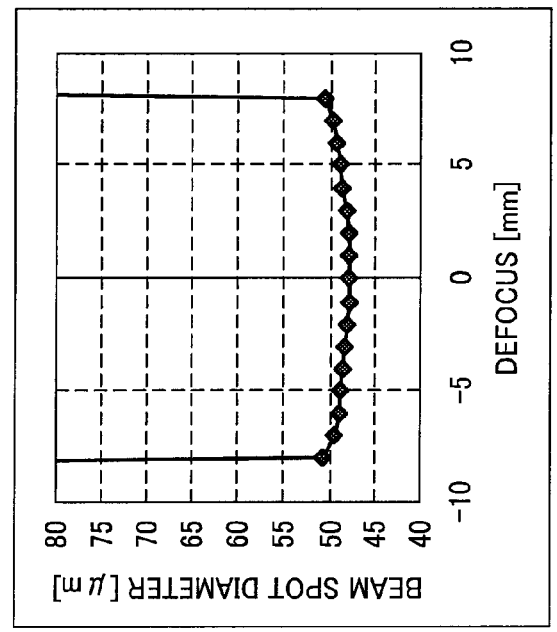
FIGS. 26A to 26C are views illustrating an embodiment 2 (simulation result) in which a depth enlarging element is used.
Figure 26A:
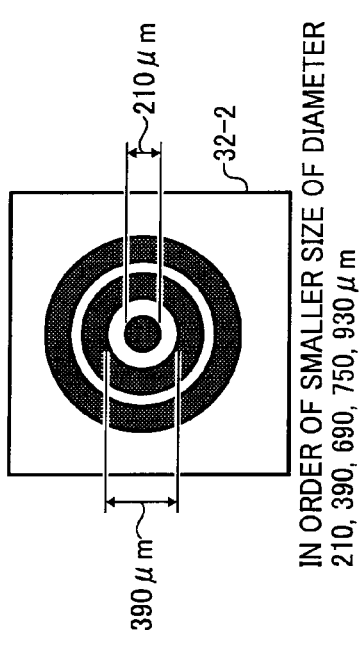
Figure 26B:
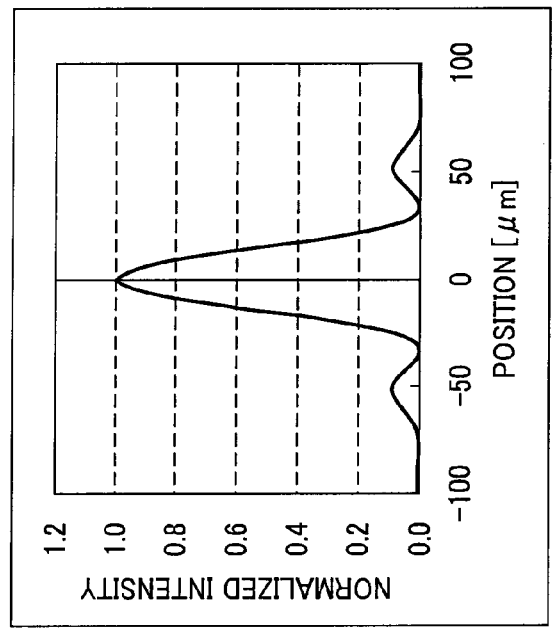
Figure 27A:
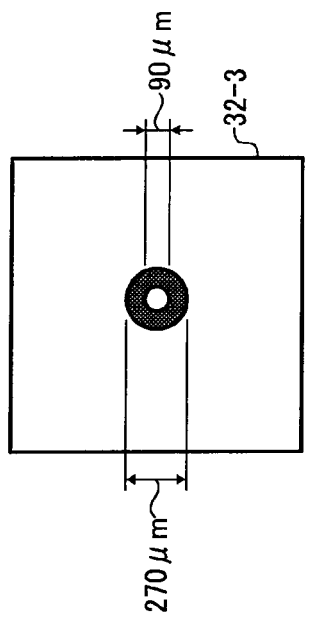
FIGS. 27A to 27C are views illustrating an embodiment 3 (simulation result) in which a depth enlarging element is used.
Figure 27B:
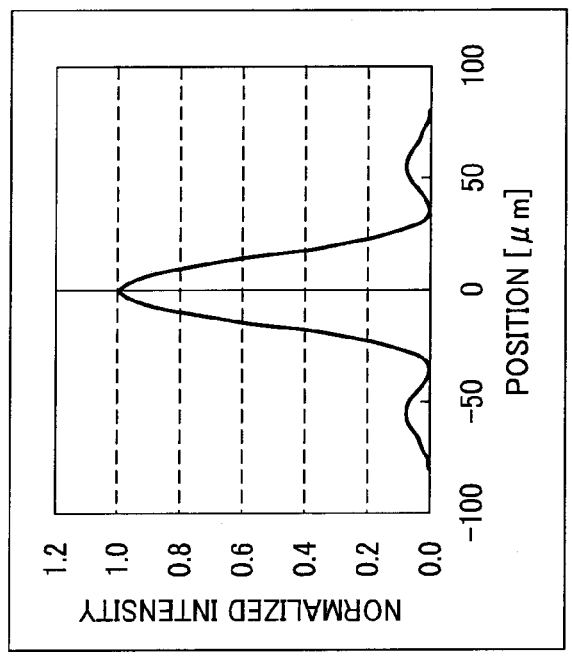
Figure 27C:
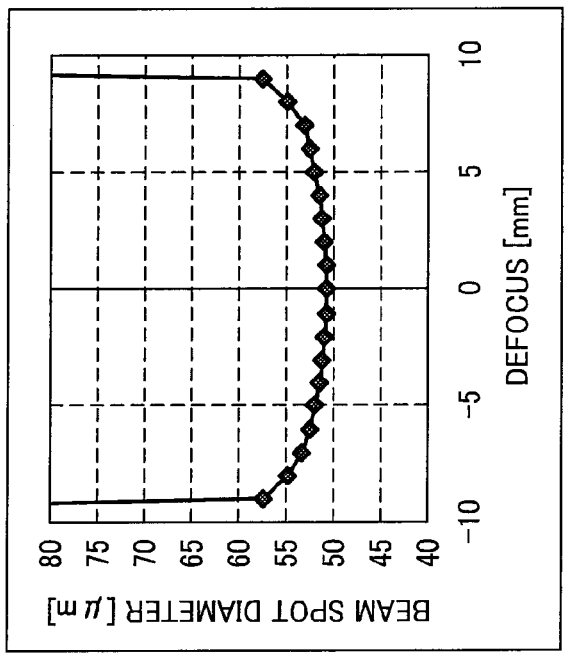
Figure 28A:
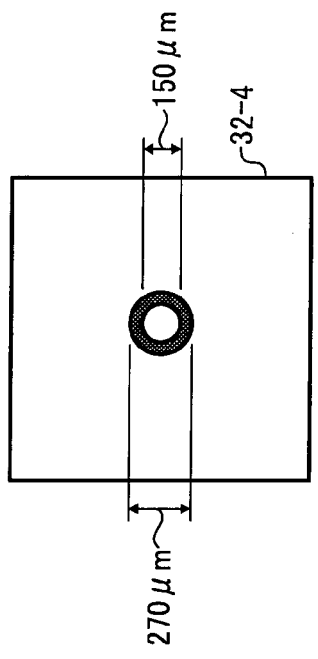
FIGS. 28A to 28C are views illustrating an embodiment 4 (simulation result) in which a depth enlarging element is used.
Figure 28B:
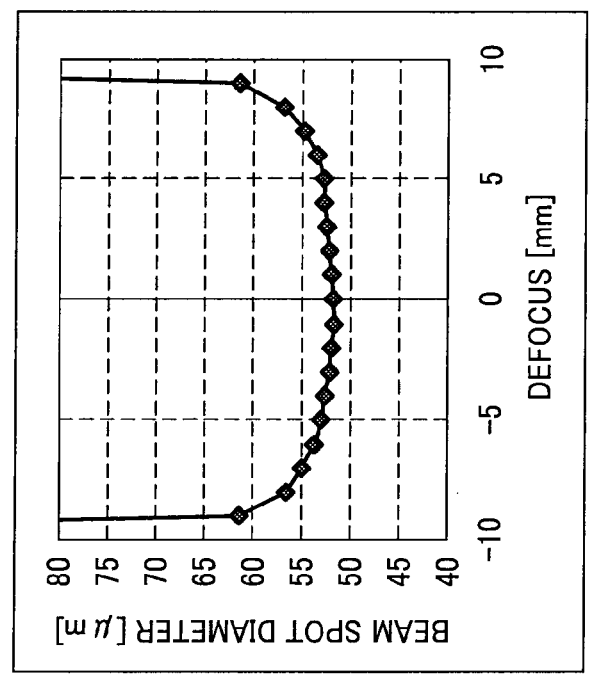
Figure 28C:
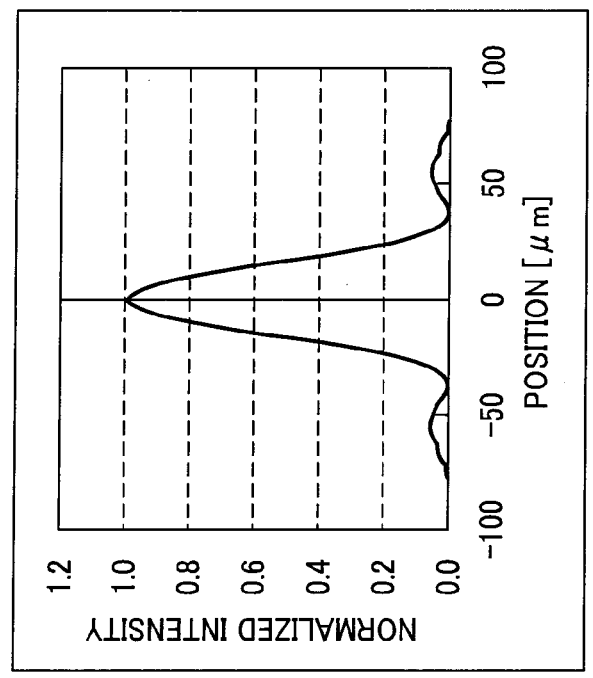
Figure 29C:
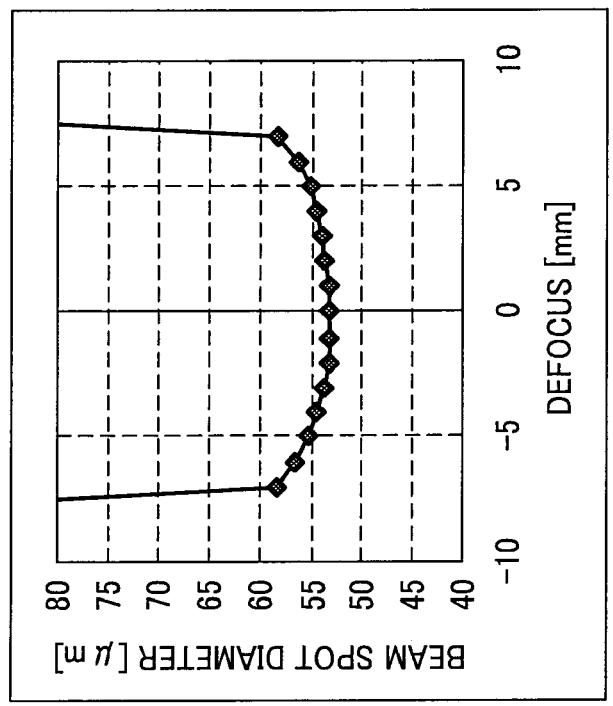
FIGS. 29A to 29C are views illustrating an embodiment 5 (simulation result) in which a depth enlarging element is used.
Figure 29A:
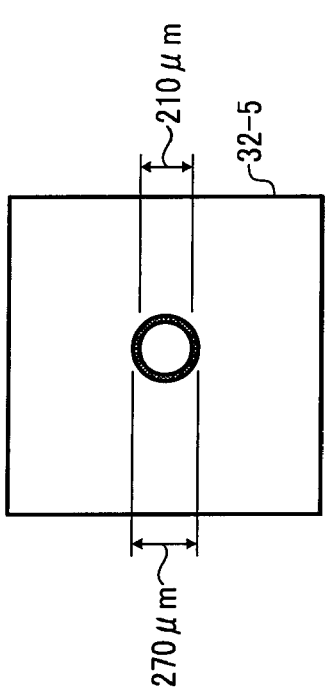
Figure 29B:
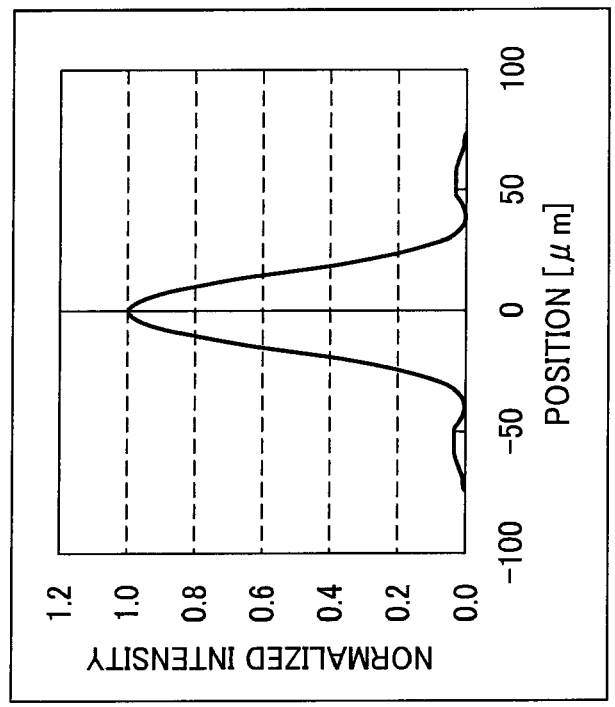

In FIG. 24A, shown is a simulation result of a beam profile on a focal position in the case where a depth enlarging element is not provided. In the drawing, peak intensity is normalized to 1. An optical system used for the simulation is shown in FIG. 23. Side lobe peak intensity in this simulation is set to 0.016 (1.6% of the peak intensity). FIG. 24B shows "the beam spot diameter vs. defocus curve," which is a simulation result with defocus amount (shift amount by which a lens moved out of a focal position) on the horizontal axis, and a 1/e^2 beam spot diameter on the vertical axis. The depth margin becomes 8.9 mm when allowing for up to 105% of a minimum beam spot diameter.

(Case where a Depth Enlarging Element is Provided)

Embodiments (simulation results) in the case where depth enlarging elements 32-1 to 32-5 are used are shown in FIGS. 25 to 29. An optical system used for the simulation is shown in FIG. 23. In FIGS. 25 to 29, Figures A (FIGS. 25A to 29A) respectively show phase distributions of depth enlarging elements 32-1 to 32-5; Figures B (FIGS. 25B to 29B) respectively show beam profiles on a focal position; and Figures C (FIGS. 25C to 29C) respectively show beam spot diameter vs. defocus curves. In each of the depth enlarging elements, a grey portion corresponds to a phase modulation portion, and a phase difference between the phase modulation portion and a region other than the phase modulation portion is set to π (a white portion stands for a phase 0, and a grey portion stands for a phase π). Further, Figures A of FIGS. 25 to 29 each show a circular phase, and the center of the aperture stop 31 and that of each of the depth enlarging elements (phase-type optical elements) 32-1 to 32-5 are caused to correspond to each other. In the following results, an optical system is set to the one in FIG. 23; in all the beam profiles, peak intensities are normalized to 1; a wavelength is set to 632.8 nm; and calculation of depth margin is made under the condition of allowing for up to 105% of a minimum beam spot diameter. Table 1 below shows a list of simulation results on side lobe peak intensity and a depth margin. Incidentally, the beam spot diameter of Table 1 represents a minimum beam spot diameter.

It can be seen that the depth margin is enlarged in the case where a phase-type optical element increasing the side lobe peak intensity is provided, and that the higher side lobe peak intensity is, the higher an enlargement rate of the depth margin is.

Moreover, when using the depth enlarging elements 32-1 to 32-5, a high-order side lobe light is low (high-order light of high intensity has not occurred on an outer side in each graph B of Figures FIGS. 25 to 29) and main lobe light of high intensity can be achieved.

(Case where a Depth Enlarging Element Not of the Present Invention is Provided)

Figure 30C:
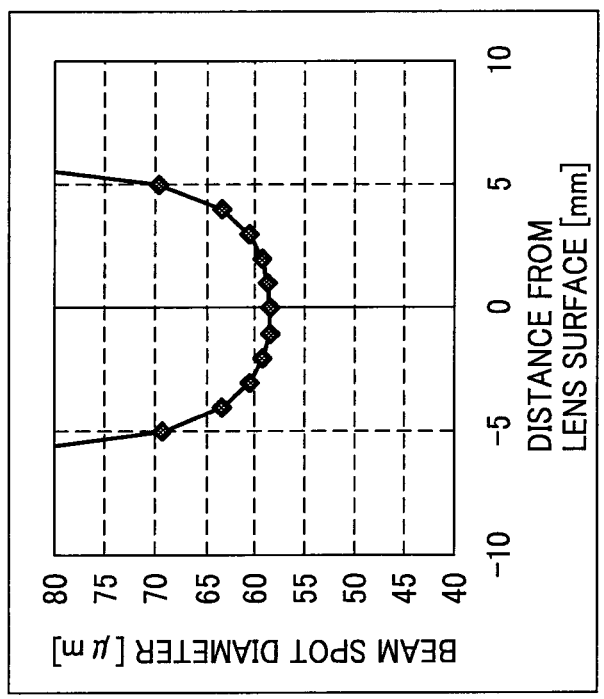
FIGS. 30A to 30C are views illustrating an example (simulation result) in which a depth enlarging element, not of the present invention, is used.
Figure 30A:
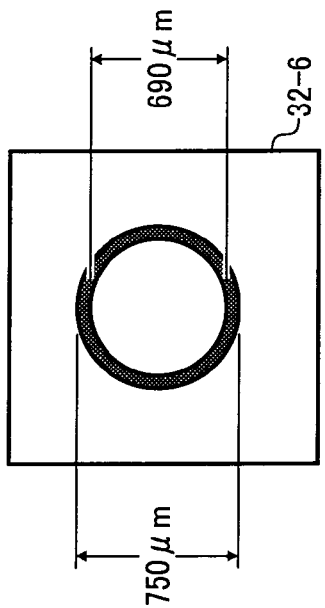
Figure 30B:
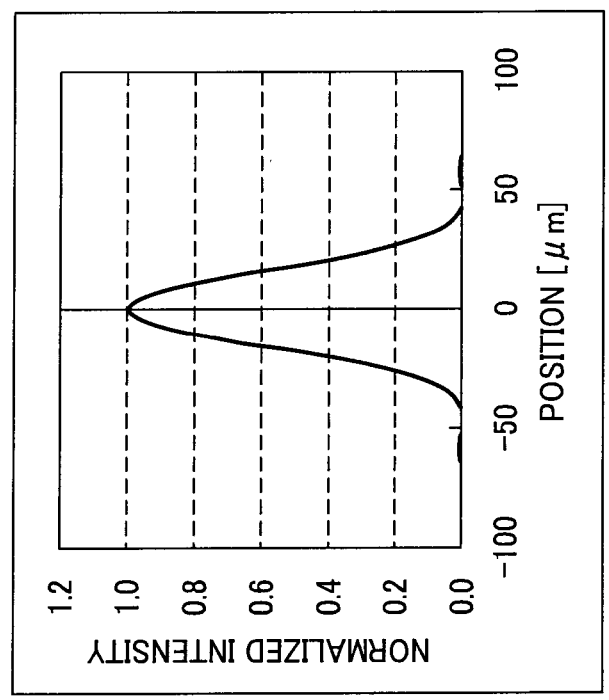

An embodiment (simulation result) using a depth enlarging element 32-6, not of the present invention, is shown in FIGS. 30A to 30C. An optical system used for the simulation is one shown in FIG. 23. FIG. 30A represents a phase distribution of a depth enlarging element; FIG. 30B shows a beam profile on a focal position; and FIG. 30C shows the beam spot diameter vs. defocus curve. In the depth enlarging element 32-6, a grey portion corresponds to a phase modulation portion, and a phase difference between the phase modulation portion and a region other than the phase modulation portion is set to π (a white portion stands for a phase 0, and a grey portion stands for a phase π). Further, FIG. 30A shows a circular phase, and the center of the aperture stop 31 and that of the depth enlarging element (a phase-type optical element) 32-6 are caused to correspond to each other. In the following results, an optical system is set to the one in FIG. 23; in a beam profile, peak intensity is normalized to 1; a wavelength is set to 632.8 nm; and calculation of depth margin is made under the condition of allowing for up to 105% of a minimum beam spot diameter. Table 1 below shows a list of simulation results on side lobe peak intensity and a depth margin. Incidentally, the beam spot diameter of Table 1 represents a minimum beam spot diameter.

When using the depth enlarging element 32-6, not of the present invention, it can be seen that depth margin is reduced.

TABLE 1

| | Side lobe peak intensity [%] | Depth margin [mm] | Beam spot diameter [μm] |
|---|---|---|---|
| Depth enlarging element is not provided | 1.6 | 8.9 | 56.4 |
| Depth enlarging element 32-1 | 10.4 | 18.0 | 48.1 |
| Depth enlarging element 32-2 | 9.6 | 15.0 | 47.7 |
| Depth enlarging element 32-3 | 8.1 | 13.8 | 50.7 |
| Depth enlarging element 32-4 | 5.8 | 12.9 | 51.8 |
| Depth enlarging element 32-5 | 3.8 | 11.2 | 53.3 |
| Depth enlarging element not of the present invention | 0.6 | 6.4 | 58.4 |

As described above, when using the depth enlarging elements 32-1 to 32-5 of the present invention, a depth of a beam spot diameter in the vicinity of a focal position of the lens 33 is enlarged. Hence, it is not necessary to add a relay optical system and the like, and thus it is very advantageous in terms of layout. Further, by using a depth enlarging element, extremely high light use efficiency can be achieved.

Figure 31:
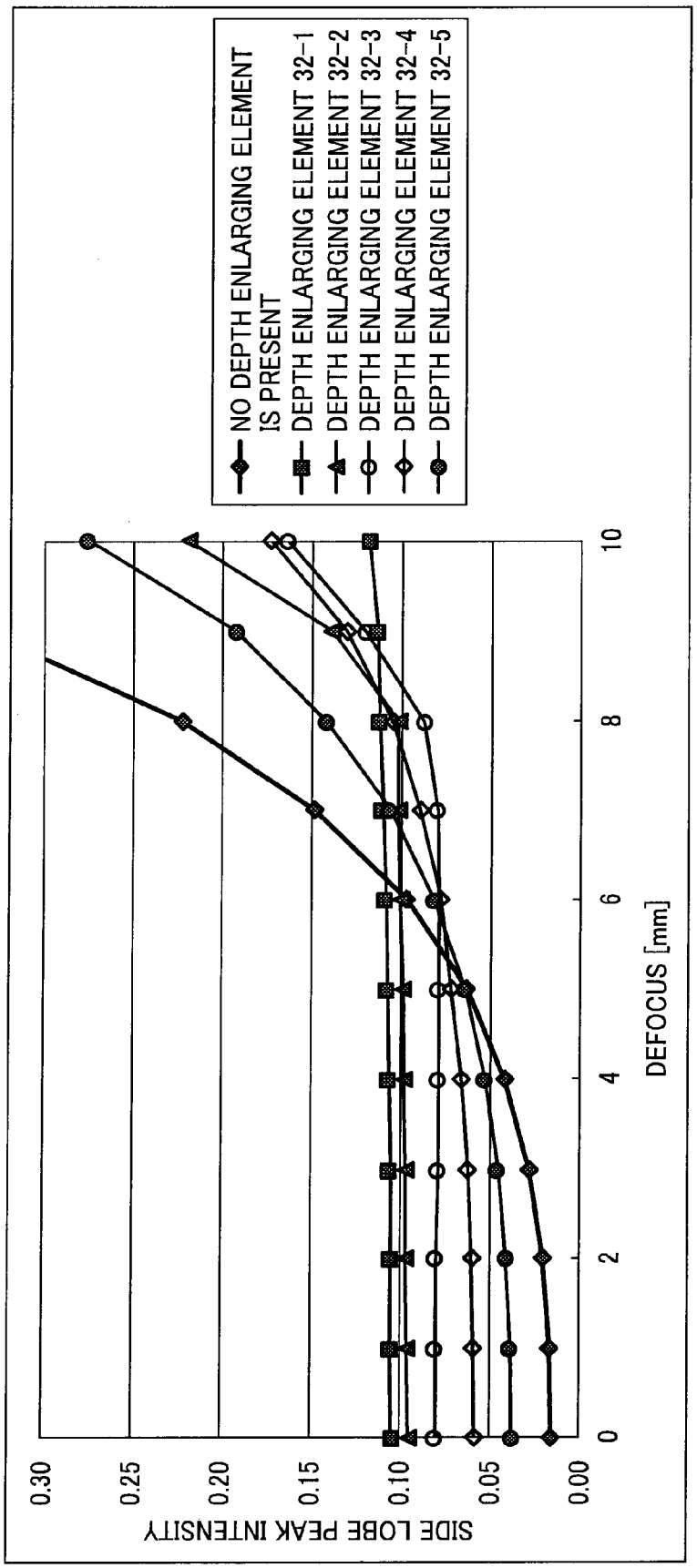
FIG. 31 is a view representing side lobe peak intensity (in which a peak intensity value is normalized to 1) by defocusing in the respective cases where a depth enlarging element is not used and where the depth enlarging element illustrated in FIGS. 25 to 29 are used.

FIG. 31 shows a graph with defocus amount [mm] on the horizontal axis and with side lobe peak intensity [when peak intensity is normalized to 1] on the vertical axis representing in the cases where the depth enlarging element is not used and where the depth enlarging elements 31-1 to 31-5 shown in FIGS. 25 to 29 are used. When using the depth enlarging element 32-6 not of the present invention, a beam profile on a position other than a focal position deteriorates so severely that a side lobe light and a main lobe light overlap with each other. As a result, side lobe peak intensity and main lobe peak intensity cannot be distinguished from each other, and thus this case is not shown in the graph. In FIG. 31, on a focal position (with defocus amount 0 mm), side lobe peak intensity obtained in the case of not using a depth enlarging element is smallest. On the other hand, on a defocus region with defocus amount larger than 5-6 mm, side lobe peak intensity obtained in the case of using a depth enlarging element is smaller, and thus this is preferable.

Note that, the embodiment described above is the case where a phase distribution is circular and rotationally symmetric, but a phase distribution is not limited to this. It is also possible to have a phase distribution which is not rotationally symmetric, or not circular.

Further, in general, an aperture stop in a light scanning device is of a rectangle longer in the main scanning direction, or of an ellipse. Hence, it is also possible for a depth enlarging element to have a phase distribution of an elliptical shape.

(Case where the Phase-Type Optical Element of the Present Invention and the Depth Enlarging Element Thereof are Provided)

Figure 32A:
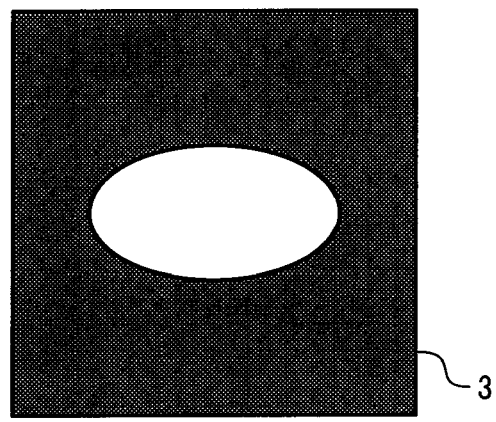
FIGS. 32A and 32B are views illustrating an embodiment in which a phase-type optical element and a depth enlarging element of the present invention are integrated and used.
Figure 32B:
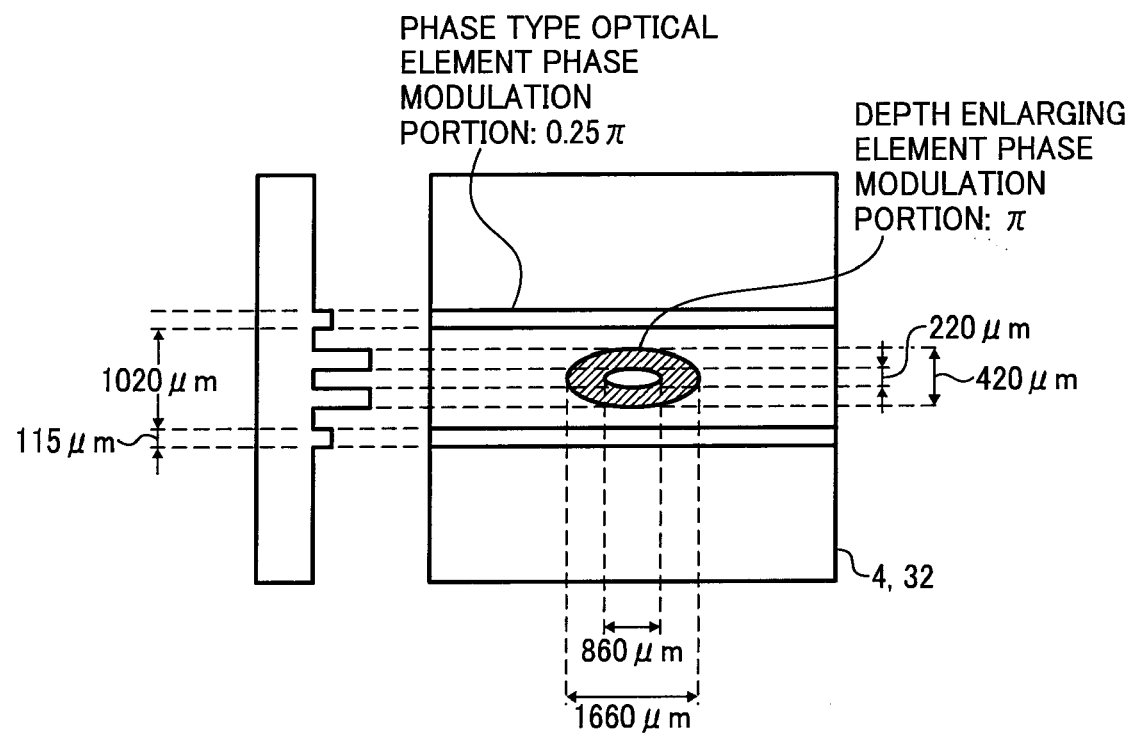

FIGS. 32A and 32B show an embodiment in which the phase-type optical element 4 of the present invention and the depth enlarging element 32 thereof are integrally used. The aperture stop 3 is set to an ellipse, and a comparison is made on the beam spot diameter vs. defocus curve in the cases where neither the phase-type optical element 4 nor the depth enlarging element 32 is used, where the depth enlarging element is used, and where both the phase-type optical element 4 and the depth enlarging element 32 are used. In this embodiment, simulation is performed assuming that the phase-type optical element 4 and the depth enlarging element 32 are disposed at the same position. Further, it is assumed that a beam entering into an aperture stop is a Gaussian beam and that a main scanning radius $(1/e^2)$ is set to 6.9 mm and a sub scanning radius $(1/e^2)$ is set to 1.9 mm.

Aperture stop: an elliptical opening as shown in FIG. 32A.

In the case where neither the phase-type optical element 4 nor the depth enlarging element 32 is used, a length (major axis) of the opening in the main scanning direction is set to 5.80 mm, and a length (minor axis) of the opening in the sub scanning direction is set to 1.39 mm.

Meanwhile, in the cases where the depth enlarging element 32 is used and where both the phase-type optical element 4 and the depth enlarging element 32 are used, a length (major axis) of the opening in the main scanning direction is set to 5.30 mm, and a length (minor axis) of the opening in the sub scanning direction is set to 1.25 mm.

Phase-type Optical Element:

It consists of two lines (line width: 115 μm) as shown in FIG. 32B. The pitch between the two lines is set to 1.02 mm, and the lines are symmetric with respect to the center of the aperture stop. A phase is set to 0.25π [radian] (a phase on a portion other than a phase modulation portion is set to 0).

Depth Enlarging Element:

It has an elliptical ring shape as shown in FIG. 32B. An internal ellipse is of main scanning width×sub scanning width=860 μm×220 μm, and an external ellipse is of main scanning width×sub scanning width=1660 μm×420 μm. A phase is set to π [radian] (a phase on a portion other than a phase modulation portion is set to 0).

Figure 33A:
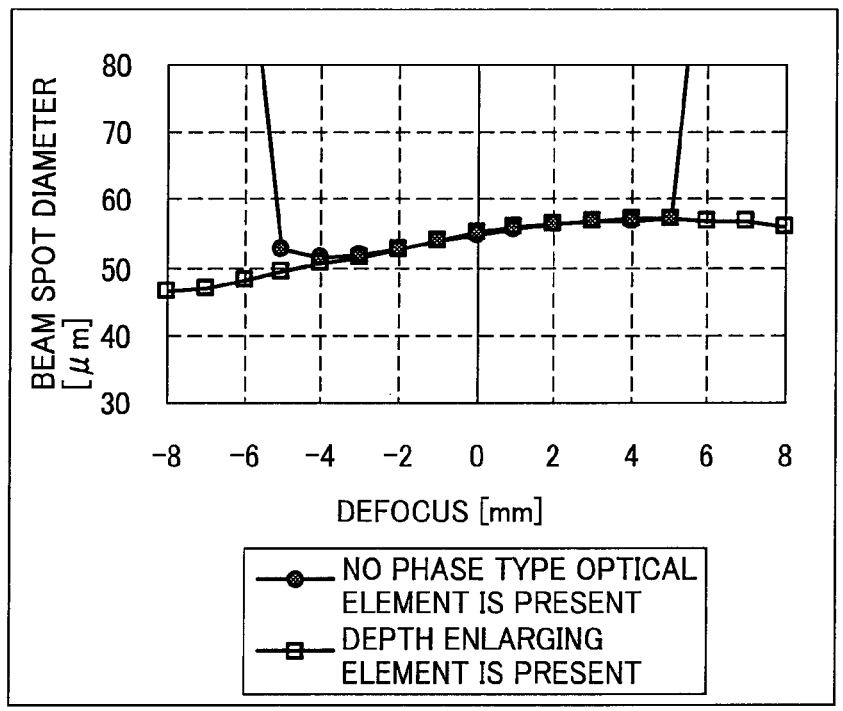
FIG. 33A is a view illustrating a comparative example of the beam spot diameter vs. defocus curve (sub scanning direction) in the respective cases where neither a phase-type optical element nor a depth enlarging element is used and where only the depth enlarging element is used.
Figure 33B:
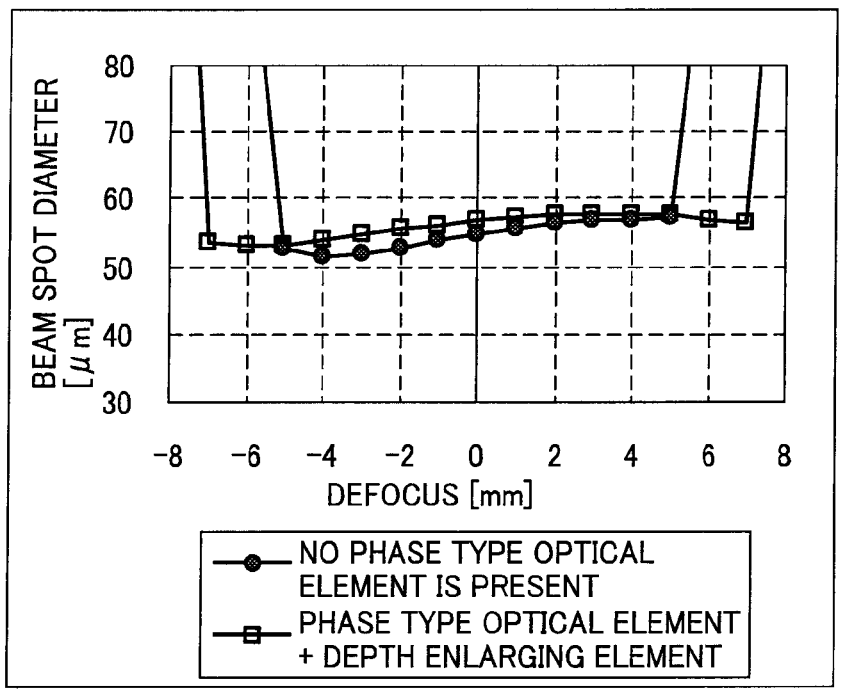
FIG. 33B is a view illustrating a comparative example of the beam spot diameter vs. defocus curve (sub scanning direction) in the respective cases where neither the phase-type optical element nor the depth enlarging element is used and where both the phase-type optical element and the depth enlarging element in FIG. 32B are used.

FIGS. 33A and 33B each show the beam spot diameter vs. defocus curve (sub scanning direction). FIG. 33A shows a comparison on those in the cases where neither the phase-type optical element nor the depth enlarging element is used and where only the depth enlarging element is used, and FIG. 33B shows a comparison on those in the cases where neither the phase-type optical element nor the depth enlarging element is used and where both the phase-type optical element and the depth enlarging element are used. In FIG. 33A, shown by filled circles represent values for the case where neither the phase-type optical element nor the depth enlarging element is used, while shown by outlined squares represent values for the case where only the depth enlarging element is used. In FIG. 33B, shown by filled circles represent values for the case where neither the phase-type optical element nor the depth enlarging element is used, and shown by outlined squares represent values for the case where both the phase-type optical element and the depth enlarging element are used.

In FIG. 33A, when using only the depth enlarging element, a large asymmetry can be seen in the beam spot diameter vs. defocus curve, and even when using the depth enlarging element, a depth has not enlarged and variation in the beam spot diameter to the defocus has been increased. As can be seen in the above case, a sufficient effect cannot be achieved by use of the depth enlarging element when such a large asymmetry occurs.

Meanwhile, when using both the phase-type optical element and the depth enlarging element, it can be seen that an asymmetry has been corrected and a depth margin has been enlarged, as in phase-type optical element+depth enlarging element of FIG. 33B.

As described above, when an asymmetry occurs in the beam spot diameter vs. defocus curve, it is preferable to correct the asymmetry using the phase-type optical element 4 and to enlarge a depth further using the depth enlarging element 32, such as the optical element shown in FIG. 32B.

When observing the beam spot diameter vs. defocus curve in a defocus range of ±3 mm, the variations in the beam spot diameter in the respective cases are as follows: from 51.8 μm to 56.7 μm (width: 4.9 μm) in the case where neither the phase-type optical element 4 nor the depth enlarging element 32 is used; from 51.7 μm to 56.9 μm (width: 5.2 μm) in the case where only the depth enlarging element 32 is used; and from 54.7 μm to 57.7 μm (width: 3 μm) in the case where both the phase-type optical element 4 and the depth enlarging element 32 are used. As can be seen from the above results, the variation in the beam spot diameter to the defocus can be reduced by using both the phase-type optical element 4 and the depth enlarging element 32.

Further, when observing the beam spot diameter vs. defocus curve in a defocus range in which a beam spot diameter is in a range of 45 μm±5 μm, the defocus ranges in the respective cases are as follows: a range of approximately −5 mm to +5 mm (width: 10 mm) in the case where neither the phase-type optical element 4 nor the depth enlarging element 32 is used; a range of approximately −4.5 mm to +5 mm (width: 9.5 mm) in the case where only the depth enlarging element 32 is used; and a range of approximately −7 mm to +7 mm (width: 14 mm) in the case where both the phase-type optical element 4 and the depth enlarging element 32 are used. In this way, the depth can be enlarged sufficiently by using both the phase-type optical element 4 and the depth enlarging element 32.

Embodiment 9

A configuration example of an image forming apparatus using the light scanning device described in the above Embodiments 1 to 8 is shown below.

Figure 34:
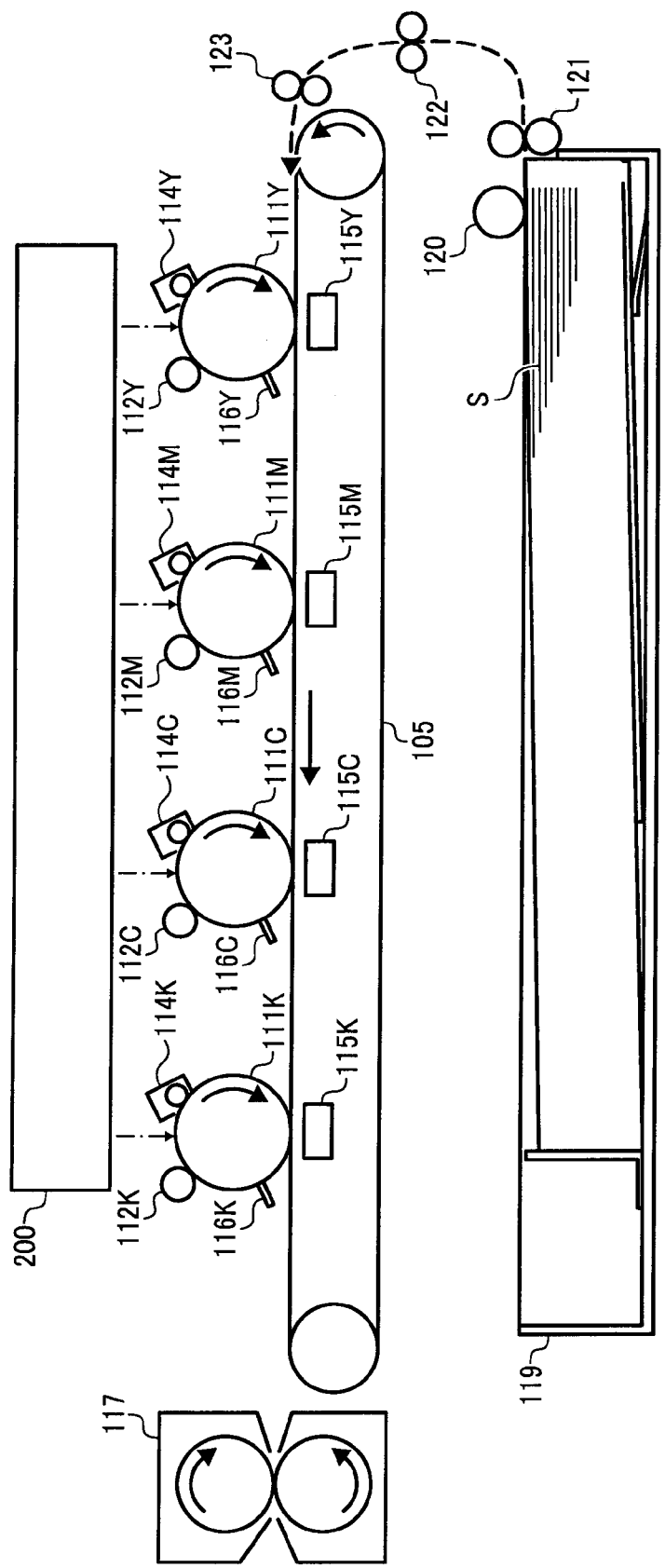
FIG. 34 is a schematic configuration view illustrating a configuration example of a multi-color image forming apparatus, using a light scanning device of the present invention.

FIG. 34 shows a configuration example of a multi-color image forming apparatus using a light scanning device according to the present invention. In the drawing, reference numerals 111Y, 111M, 111C, and 111K represent photosensitive drums, which are disposed in parallel along a transcription belt 118, and correspond to the photosensitive drums 101, 102, 103, and 104 shown in FIGS. 1 to 3.

The photosensitive drums 111Y, 111M, 111C, and 111K each rotate in the same direction as an arrow in the drawing, and disposed on the peripheries thereof are such as: charging devices 112Y, 112M, 112C, and 112K (those shown in the drawing are of contact type using charging rollers, and alternatively, a charging brush, a non-contact type corona charger, or the like can be used); a light scanning device 200 such as one in each of Embodiments 1 to 8; developing devices 114Y, 114M, 114C, and 114K of respective colors; transcribers (a transcribing charger, a transcribing roller, a transcribing brush, or the like) 115Y, 115M, 115C, and 115K; and cleaners 116Y, 116M, 116C, and 116K. Further, in the drawing, reference numeral 117 denotes a fixing device, 119 a paper cassette loaded with a sheet-like transcription medium S such as recording paper, 120 a feed roller, 121 a separation roller, 122 a transfer roller, and 123 a resist roller.

The photosensitive drums 111Y, 111M, 111C, and 111K are exposed to a light beam with its intensity modulated depending on image information, using the light scanning device 200 being a latent image forming device, so that an electrostatic latent image is formed. A basic configuration of the light scanning device 200, which performs the above exposure process, is as described in Embodiment 1, and in an example of FIG. 34, beams in four systems are sorted using one deflector (a light deflector) 213, as in FIGS. 1 to 3, so as to perform a scan. To be more specific, the light scanning device 200 shown in FIG. 34 includes: four light source units 250 and cylindrical lenses 209 so as to correspond to the four photosensitive drums 111Y, 111M, 111C, and 111k; a polygon mirror 213 being a deflector; optical systems (fθ lenses 2181 to 2184, light path refraction mirrors 224 and 227, a toroidal lens 220, and the like) in four systems. With this configuration, light beams in the four systems are sorted to left and right using the one deflector 213 so as to perform a scan, and the optical systems in the four systems irradiate the photosensitive drums 111Y, 111M, 111C, and 111K with respective light beams.

The electrostatic latent images formed on the respective photosensitive drums 111Y, 111M, 111C, and 111K are developed by the yellow (Y) development device 114Y, the magenta (M) development device 114M, the cyan (C) development device 114C, and the black (K) development device 114K, and are visualized as toner images of respective colors of yellow (Y), magenta (M), cyan (C), and black (K). Further, the sheet-like transcription medium S is fed one at a time from the paper cassette 119 at a proper timing in this development process by the feed roller 120 and the separation roller 121, and is moved to the resist roller 123 through the transfer roller 122. The sheet-like transcription medium S is sent toward the transcription belt 118 by the resist roller 123 at a timing at which each of the toner images on the respective photosensitive drums 111Y, 111M, 111C, and 111K visualized in the above development process comes to a corresponding transcription position, and is transferred in sequence to the corresponding transcription position of each of the colors while supported by the transcription belt 118. A transcription bias is applied from the transcribers 115Y, 115M, 115C, and 115K disposed so as to face the respective photosensitive drums 111Y, 111M, 111C, and 111K with the transcription belt 118 sandwiched therebetween, and toner images on the photosensitive drums 111Y, 111M, 111C, and 111K are transcribed sequentially to the sheet-like transcription medium S so that the toner images overlap with each other. The toner image (color image) transcribed on the sheet-like transcription medium S, in which the toner images of four colors overlap with each other, is fixed by heat and pressure using the fixing device 117. The sheet-like transcription medium S on which the toner images have been fixed is discharged to a paper ejection unit, not shown in the drawing, on the outside of the device. After transcribing the toner images, the respective photosensitive drums 111Y, 111M, 111C, and 111K are cleaned with cleaning members (a blade, a brush, and the like) of the cleaners 116Y, 116M, 116C, and 116K, so that remaining toner and paper dust are removed.

Note that, the image forming apparatus shown in FIG. 34 has a monochromatic mode in which an image of any one color of yellow (Y), magenta (M), cyan (C), and black (K) is formed; a two-color mode in which images of any two colors thereof are formed so that the images overlap with each other; a three-color mode in which images of any three colors thereof are formed so that the images overlap with each other; and a full color mode in which overlapped images of the above four colors are formed. It is possible to form images of one color, a multi-color, and full colors by performing the modes to be selected in an operation unit not shown.

In the image forming apparatus having the configuration shown in FIG. 34, a multi-color image is formed on the sheet-like transcription medium S through the processes of charging→exposure→development→transcription using image creating units of the respective colors. However, instead of the process in which a transcription is made directly from each of the photosensitive drums 111Y, 111M, 111C, and 111K on the sheet-like transcription medium S, the image forming apparatus may be the one of intermediate transcription type, having a configuration using an intermediate transcription medium such as an intermediate transcription belt, in which a first transcription is performed on an intermediate transcription belt from each of the photosensitive drums 111Y, 111M, 111C, and 111K so that overlapped images of respective colors are formed, and thereafter a second transcription is performed on the sheet-like transcription medium S all at once from the intermediate transcription belt.

As described above, in the image forming apparatus of the present invention, a multi-color image or a full color image is formed on the sheet-like transcription medium S through the processes of charging→exposure→development→transcription using image creating units of the respective colors. It is possible to check the variation in the beam spot diameter on the respective photosensitive drums by applying a light scanning device using the phase-type optical element (or the phase-type optical element and depth enlarging element) to the above described image forming apparatus. Accordingly, the variation in the dot diameter of output images can be checked, and thus high resolution images having a uniform dot diameter can be provided. In addition, a stability of the beam spot diameter on the respective photosensitive drums means that one of multiple process control conditions is stabilized. Thus, a frequency of process control can be reduced, and reduction of environmental burdens, such as energy conservation, can be achieved.

The light scanning device of the present invention includes a phase-type optical element, and by providing a phase modulation portion to at least part of the phase-type optical element and by having a phase difference between a phase on the phase modulation portion and a phase on the portion other than the phase modulation portion so as to be different from $\pi$ [radian], the light scanning device thereof is capable of correcting asymmetry in the beam spot diameter vs. defocus curve. As a result, the variation in the beam spot diameter to the defocus can be reduced so that a light scan can be made with high accuracy, and further, the parameter of the distance between a light source and a deflector can be set to a small value so that the size of the light scanning device can be reduced.

In this light scanning device, the foregoing phase-type optical element is provided between the light source and the deflector, whereby asymmetry in the beam spot diameter vs. defocus curve can be corrected to heights of all the images.

Further, the phase-type optical element is integrated with the aperture stop. Accordingly, the phase-type optical element can retain a relative positional relationship between the aperture stop and the phase-type optical element with high accuracy, even after a certain period of time has elapsed, whereby a reduction in a correction effect for asymmetry in the beam spot diameter vs. defocus curve can be checked.

A coupling lens is provided between the light source and the deflector, and the phase-type optical element is integrated with the coupling lens. Accordingly, the number of components can be reduced, and thus a cost reduction can be realized.

In addition, a cylindrical lens is provided between the light source and the deflector, and the phase-type optical element is integrated with the cylindrical lens. Accordingly, the number of components can be reduced, and thus a cost reduction can be realized.

The phase-type optical element is integrated with the scanning lenses. Accordingly, the number of components can be reduced and thereby a cost reduction can be realized.

The phase-type optical element is provided to a surface closest to the deflector, of the scanning lenses, whereby it becomes possible to check a variation in the relative positional relationship between the aperture stop and the phase-type optical element, which would occur at the initial time (at the time of manufacturing thereof) or after a certain period of time elapses. Accordingly, a stable correction effect for the "asymmetry in the beam spot diameter vs. defocus curve" can be obtained even after a certain period of time has elapsed.

The phase modulation portion of the phase-type optical element is provided in the form of parallel lines in the main scanning direction which is a scanning direction of a light beam by the deflector, whereby a correction can be made to the "asymmetry in the beam spot diameter vs. defocus curve" in the sub scanning direction which tends to occur in this direction. In this way, an influence on the beam spot diameter vs. defocus curve in the main scanning direction can be checked.

A phase-type optical element (hereinafter, referred to as a depth enlarging element) having a phase distribution for enlarging a depth margin on the scanned surface is provided, and a phase distribution of the depth enlarging element is set so that a first ratio, being a ratio of peak intensity of a side lobe light to that of a main lobe light in a light intensity profile on a focal position of a scanning lens in the case where a depth enlarging element is provided, is higher than a second ratio being a ratio of peak intensity of a side lobe light to that of a main lobe light in a light intensity profile on a focal position of a scanning lens in the case where a depth enlarging element is assumed not to be provided. In this way, a depth of a beam spot diameter can be enlarged even when asymmetry in the beam spot diameter vs. defocus curve occurs.

Further, by providing the above-mentioned light scanning device, an image forming apparatus can be provided, which can acquire high-resolution images on which the variation in dots is checked.

Furthermore, this image forming apparatus can acquire high-resolution multi-color or color images on which the variation in dots is checked.

Incidentally, although the above-described embodiments have been described referring to the examples of the multi-color (color) image forming apparatus, the present invention is also applicable to a monochromatic image forming apparatus.

In addition, the light scanning device of the present invention is also applicable to laser-scanning type laser processing equipment, a laser measurement device, and the like.

Although the preferred embodiments of the present invention have been described, it should be understood that the present invention is not limited to these embodiments, various modifications and changes can be made to the embodiments.

What is claimed is:

1. A light scanning device, comprising:
a light source;
an aperture stop configured to regulate a width of a light beam emitted from the light source;
a deflector configured to deflect and scan the light beam emitted from the light source;
at least one scanning lens configured to form an image on a scanned surface with the light beam thus deflected and scanned; and
a phase-type optical element,
wherein at least a portion of the phase-type optical element is provided with a phase modulation portion, and
a phase difference between the phase modulation portion and a region, of the phase-type optical element, other than the phase modulation portion is not $\pi$ [radian].

2. The light scanning device according to claim 1, wherein the phase-type optical element is provided between the light source and the deflector.

3. The light scanning device according to claim 2, wherein the phase-type optical element is integrated with the aperture stop.

4. The light scanning device according to claim 2, further comprising:
a coupling lens provided between the light source and the deflector,
wherein the phase-type optical element is integrated with the coupling lens.

5. The light scanning device according to claim 2, further comprising:
a cylindrical lens provided between the light source and the deflector,
wherein the phase-type optical element is integrated with the cylindrical lens.

6. The light scanning device according to claim 1, wherein the phase-type optical element is integrated with the scanning lens.

7. The light scanning device according to claim 6, wherein the phase-type optical element is provided to a surface closest to the deflector of the scanning lens.

8. The light scanning device according to claim 1, wherein the phase modulation portion of the phase-type optical element is provided in the form of parallel lines in a main scanning direction that is a scanning direction in which the light beam is scanned by the deflector.

9. The light scanning device according to claim 1, further comprising:
a phase-type optical element that is called a depth enlarging element and has a phase distribution for enlarging a depth margin on the scanned surface.

10. The light scanning device according to claim 9, wherein the depth enlarging element has a phase distribution in which a first ratio is higher than a second ratio, the first ratio representing a ratio of peak intensity of a side lobe light to peak intensity of a main lobe light in a light intensity profile on a focal position of the scanning lens, and the second ratio representing a ratio as a ratio of peak intensity of a side lobe light to peak intensity of a main lobe light in a light intensity profile on a focal position of the scanning lens in the case where the depth enlarging element is assumed not to be provided.

11. An image forming apparatus for outputting an image, comprising:
an image supporter;
a light scanning device configured to irradiate the image supporter with a light beam and thereby to form an electrostatic latent image;
a development device configured to visualize, with a developer, the electrostatic latent image formed on the image supporter by the light scanning device; and
a transcription device configured to transcribe an image visualized on the image supporter on a transcription medium directly or through an intermediate transcription body,
wherein the light scanning device according to claim 1 is included therein as the light scanning device.

12. An image forming device made for outputting a multi-color image or a color image, comprising:
a plurality of image supporters disposed in parallel each other;
a light scanning device configured to irradiate the plurality of respective image supporters with a light beam and thereby to form electrostatic latent images;
a development device configured to visualize, with developers of different colors, the electrostatic latent images formed on the respective image supporters by the light scanning device; and
a transcription device configured to transcribe the color images visualized on the respective image supporters on a transcription medium directly or through an intermediate transcription body so as to overlap the color images with each other,
wherein the light scanning device as recited in claim 1 is included as the light scanning device.

* * * * *